(12) United States Patent
Shayani et al.

(10) Patent No.: US 11,861,461 B2
(45) Date of Patent: Jan. 2, 2024

(54) TECHNIQUES FOR GENERATING DESIGNS THAT REFLECT STYLISTIC PREFERENCES

(71) Applicant: AUTODESK, INC., San Francisco, CA (US)

(72) Inventors: Hooman Shayani, London (GB); Mark Thomas Davis, Mill Valley, CA (US)

(73) Assignee: AUTODESK, INC., San Francisco, CA (US)

( * ) Notice: Subject to any disclaimer, the term of this patent is extended or adjusted under 35 U.S.C. 154(b) by 744 days.

(21) Appl. No.: 16/534,982

(22) Filed: Aug. 7, 2019

(65) Prior Publication Data

US 2020/0050736 A1 Feb. 13, 2020

Related U.S. Application Data

(60) Provisional application No. 62/716,845, filed on Aug. 9, 2018.

(51) Int. Cl.
*G06N 20/00* (2019.01)
*G06F 30/00* (2020.01)
(Continued)

(52) U.S. Cl.
CPC ........... *G06N 20/00* (2019.01); *G06F 18/214* (2023.01); *G06F 30/00* (2020.01); *G06F 30/17* (2020.01);
(Continued)

(58) Field of Classification Search
CPC ........ G06N 20/00; G06N 7/005; G06N 5/022; G06N 3/0472; G06N 3/126; G06N 3/088;
(Continued)

(56) References Cited

U.S. PATENT DOCUMENTS 5,297,054 A * 3/1994 Kienzle .................. G06F 30/00
706/919
6,110,213 A * 8/2000 Vinciarelli .............. G06F 30/00
703/1

(Continued)

OTHER PUBLICATIONS

Lant, Kara, Generative Design Could Radically Transform The Look of Our World Futurism, Aug. 14, 2017 (Year: 2017).*

(Continued)

*Primary Examiner* — Scott L Jarrett
(74) *Attorney, Agent, or Firm* — Artegis Law Group, LLP

(57) ABSTRACT

In various embodiments, a stylization application generates designs that reflect stylistic preferences. In operation, the stylization application computes characterization information based on a first design and a trained machine-learning model that maps one or more designs to characterization information associated with one or more styles. The stylization application then computes a style score based on the characterization information and a target style that is included in the one or more styles. Subsequently, the stylization application generates a second design based on the style score, where the second design is more representative of the target style than the first design. Advantageously, because the stylization application can substantially increase the number of designs that can be generated based on the target style in a given amount of time, relative to more manual prior art techniques, the overall quality of the design ultimately selected for production can be improved.

17 Claims, 7 Drawing Sheets

(51) Int. Cl.
  *G06Q 10/0639* (2023.01)
  *G06F 30/27* (2020.01)
  *G06F 18/214* (2023.01)
  *G06F 3/0484* (2022.01)
  *G06T 11/00* (2006.01)
  *G06N 3/088* (2023.01)
  *G06F 30/17* (2020.01)

(52) U.S. Cl.
  CPC ............ *G06F 30/27* (2020.01); *G06N 3/088* (2013.01); *G06Q 10/06393* (2013.01); *G06T 11/001* (2013.01); *G06F 3/0484* (2013.01)

(58) Field of Classification Search
  CPC ...... G06N 3/0445; G06N 3/008; G06N 3/006; G06N 3/0454; G06N 3/08; G06F 30/00; G06F 2111/04; G06F 30/13; G06F 2111/20; G06F 30/12; G06F 30/10; G06F 30/27; G06F 2111/02
  See application file for complete search history.

(56) References Cited

U.S. PATENT DOCUMENTS

| | | | |
|---|---|---|---|
| 3,044,973 | A1 | 10/2011 | Perani et al. |
| 8,521,478 | B2* | 8/2013 | Debono ............... G06F 30/00 703/1 |
| 10,311,366 | B2* | 6/2019 | Portilla ............... G06F 3/0488 |
| 10,614,268 | B1 | 4/2020 | Howard et al. |
| 11,354,607 | B2* | 6/2022 | Byron ............... G06Q 10/063 |
| 2009/0102832 | A1* | 4/2009 | Behr ............... G06T 19/20 345/418 |
| 2009/0248369 | A1* | 10/2009 | Debono ............... G06F 30/00 703/1 |
| 2013/0090897 | A1* | 4/2013 | Uchikura ............ H05K 3/0005 703/1 |
| 2015/0324490 | A1* | 11/2015 | Page ............... B33Y 50/00 700/98 |
| 2016/0055132 | A1 | 2/2016 | Garrison et al. |
| 2016/0342315 | A1 | 11/2016 | Jaramillo, III et al. |
| 2018/0285517 | A1* | 10/2018 | Reichental ............ G06F 30/17 |
| 2018/0349795 | A1* | 12/2018 | Boyle ............... G06Q 10/063 |
| 2019/0057167 | A1* | 2/2019 | Reichert ............ G06F 30/15 |
| 2019/0073335 | A1* | 3/2019 | Foley ............... G06K 9/6256 |
| 2019/0080425 | A1* | 3/2019 | Bui ............... G06Q 10/0631 |
| 2019/0325628 | A1* | 10/2019 | Dubey ............... G06F 30/00 |
| 2019/0332725 | A1* | 10/2019 | Wawrzyniak ......... G06F 30/27 |
| 2019/0347539 | A1* | 11/2019 | Nagy ............... G06N 20/00 |
| 2020/0005087 | A1* | 1/2020 | Sewak ............... G06N 3/08 |
| 2020/0050710 | A1* | 2/2020 | Shayani ............ G06N 20/00 |

OTHER PUBLICATIONS

Respini-Irwin, Cyrena, Autodesk Announces Its First Commercial Generative Design Product Cadalyst, Jun. 29, 2017 (Year: 2017).*

Ghiasi, Golnz et al., Exploring the structure of real-time, arbitrary neural artistic stylization network Computer Science, May 18, 2017 (Year: 2017).*

Nilsson, Alexander et al., A Framework for Generative Product Design Powered by Deep Learning and Artificial Intelligence Linkoping University, Jun. 14, 2018 (Year: 2018).*

Lim, Isaak et al., Identifying Style of 3D Shapes using Deep Metric Learning Eurographics Symposium on Geometry Processing, vol. 35, No. 5, 2016 (Year: 2016).*

Lun, Zhaoliang et al., Elements of Style: Learning Perceptual Shape Style Similarity ACM Transactions of Graphics, vol. 34, No. 4, Aug. 2015 (Year: 2015).*

Final Office Action received for U.S. Appl. No. 16/534,985 dated Dec. 22, 2021, 16 pages.

Non Final Office Action received for U.S. Appl. No. 16/534,985 dated Jul. 22, 2021, 14 pages.

Junjie Cao et al., "Point Cloud Skeletons via Laplacian-Based Contraction", IEEE International Conference on Shape Modeling and Applications (SMI) 2010, 11 pages.

Andrea Tagliasacchi et al., "Mean Curvature Skeletons", Eurographics Symposium on Geometry Processing 2012, pp. 10.

Jakob Wenzel et al. "Interactive field-aligned mesh generator", URL:https://github.com/wjakob/instant-meshes, retrieved on Nov. 23, 2020, 4 pages.

Digital Simulation From conceptual optimization to CAD, URL:https://www.youtube.com/watch?v=QhQmNzz0tGg, retrieved on Nov. 23, 2020, Feb. 2, 2017, 1 page.

SolidThinking Inspire 2018 New Features: PolyNURBS Fit, URL:https://www.youtube.com/watch?v=4QFu1r7JEC0, retrieved on Nov. 23, 2020, Feb. 2, 2017, 1 page.

Brendan McMahan et al., "Federated Learning: Collaborative Machine Learning without Centralized Training Data", Google AI Blog, URL:https://ai.googleblog.com/2017/04/federated-learning-collaborative.html, retrieved on Nov. 23, 2020, Apr. 6, 2017, 4 pages.

Robin Geyer et al., "Differentially Private Federated Learning: A Client Level Perspective", URL:https://medium.com/sap-machine-learning-research/client-sided-differential-privacy-preserving-federated-learning-1fab5242d31b, retrieved on Nov. 23, 2020, Jan. 29, 2018, 7 pages.

International Search Report for application No. PCT/US2019/046034 dated Nov. 13, 2019.

Makow et al., "Exploring Style Transfer: Extensions to Neural Style Transfer", URL:http://cs231n.stanford.edu/reports/2017/pdfs/428.pdf, retrieved on Oct. 31, 2019, Jul. 2, 2017, 7 pages.

Martinez et al., "Structure and Appearance Optimization for Controllable Shape Design", ACM Transactions on Graphics, ACM, vol. 34, No. 6, Article 229, DOI:10.1145/2816795.2818101, Nov. 2015, pp. 229:1-229:11.

Lun et al., "Functionality Preserving Shape Style Transfer", ACM Transactions on Graphics, ACM, vol. 35, No. 6, Article 209, DOI:10.1145/2980179.2980237, Nov. 2016, pp. 209:1-209:14.

Anonymous: "Index of /reports/2017/pdfs", Oct. 31, 2019 (Oct. 31, 2019), XP055637775, Retrieved from the Internet: URL:http://cs23ln.stanford.edu/reports/2017/pdfs/, p. 4.

Non Final Office Action received for U.S. Appl. No. 16/534,985 dated Sep. 14, 2022, 17 pages.

Final Office Action received for U.S. Appl. No. 16/534,985 dated Feb. 1, 2023, 18 pages.

Non Final Office Action received for U.S. Appl. No. 16/534,985 dated Jun. 16, 2023, 23 pages.

Notice of Allowance received for U.S. Appl. No. 16/534,985 dated Nov. 14, 2023, 9 pages.

* cited by examiner

TECHNIQUES FOR GENERATING DESIGNS THAT REFLECT STYLISTIC PREFERENCES

CROSS-REFERENCE TO RELATED APPLICATIONS

This application claims the priority benefit of the United States Provisional Patent Application titled "GENERATING DESIGNS VIA MACHINE LEARNING TECHNIQUES" filed on Aug. 9, 2018 and having Ser. No. 62/716,845. The subject matter of this related application is hereby incorporated herein by reference.

BACKGROUND

Field of the Various Embodiments

Embodiments of the present invention relate generally to computer-aided design and computer-aided design software and, more specifically, to techniques for generating designs that reflect stylistic preferences.

Description of the Related Art

For many objects, the style of the object can be as important, if not more important, than functional aspects of the object. For example, the appearance of an automobile is often as important as the performance. In a typical design process for such an object, a designer manually generates an initial design that reflects the desired style of the object and then manually modifies the initial design to generate a production design that meets functional aspects of the object. For example, a designer could generate an initial design for the dashboard of an automobile that fits with the overall appearance of the automobile. Subsequently, the designer could make design modifications that increase the rigidity of the dashboard enough to withstand the stresses expected during operation of the automobile.

One drawback of a manual design process is that generating and modifying the initial design can be tedious and prohibitively time-consuming. If the time allocated for design activities is limited, then the designer may be able to consider only a limited number of design options during the design process, which can reduce the overall quality of the production design. Additionally, many novice designers are unable to generate designs manually that have a desired style without assistance from more experienced designers who are familiar with that particular style.

In an attempt to reduce the time required for design activities, some designers use a generative design process. Generative design is a computer-aided design process that automatically synthesizes designs that satisfy any number and type of objective goals and constraints. Because particular styles are difficult, if not impossible, to express in an objective fashion, designers usually specify only the functional goals and constraints for their designs when implementing the generative design process. A generative design application then executes various optimization algorithms to generate a generative design space that includes a large number (e.g., thousands) of designs that satisfy those functional goals and constraints. The designer subsequently explores the generative design space, manually viewing and evaluating the different designs and selecting a single, final design for additional design and/or manufacturing activities.

One drawback of using a generative design process is that the resulting designs oftentimes have "organic" shapes, meaning that the designs have lumpy shapes that reflect the optimal way various forces can impact the shapes of the objects making up the designs. In essence, the performance of an organic shape is optimized by the generative design process, but the overall appearance of the organic shape is not taken into account. Because of the prevalence of organic shapes in a typical generative design space, oftentimes none of the designs generated via a generative design process are aesthetically acceptable to the designer. Further, even if a particular design generated via a generative design process is aesthetically acceptable to the designer, manufacturing the organic shapes included in the design is usually inefficient. For example, to reproduce the lumps that characterize an organic shape, a Computer Numerical Control ("CNC") milling machine would have to perform many very long tool paths involving many time-consuming grinding operations.

As the foregoing illustrates, what is needed in the art are more effective techniques for accounting for stylistic preferences when automatically generating designs.

SUMMARY

One embodiment of the present invention sets forth a computer-implemented method for generating designs that accounts for stylistic preferences. The method includes computing first characterization information based on a first design and a trained machine-learning model that maps one or more designs to characterization information associated with one or more styles; computing a style score based on the first characterization information and a target style that is included in the one or more styles; and generating a second design based on the style score, where the second design is more representative of the target style than the first design.

At least one technical advantage of the disclosed techniques relative to the prior art is that, unlike prior art approaches, the disclosed techniques provide an automated workflow for generating and evaluating designs based on a target style that reflect aesthetic and/or manufacturing-related preferences. In some embodiments, a graphical user interface ("GUI") allows style-related input (i.e., training data for a machine-learning model and subsequently a target style) to be specified, a machine-learning style model is trained based on the training data, and the trained machine-learning style model is used to quantify designs with respect to the target style. By contrast, prior art techniques provide neither GUIs that enable style-related input nor mechanisms that effectively account for style-related input. Because the disclosed techniques can substantially increase the number of designs that can be generated and evaluated based on the target style in a given amount of time, relative to prior art approaches, the overall quality of the design ultimately selected for production can be improved. Further, novice designers can implement the automated workflow successfully, without assistance from more experienced designers. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
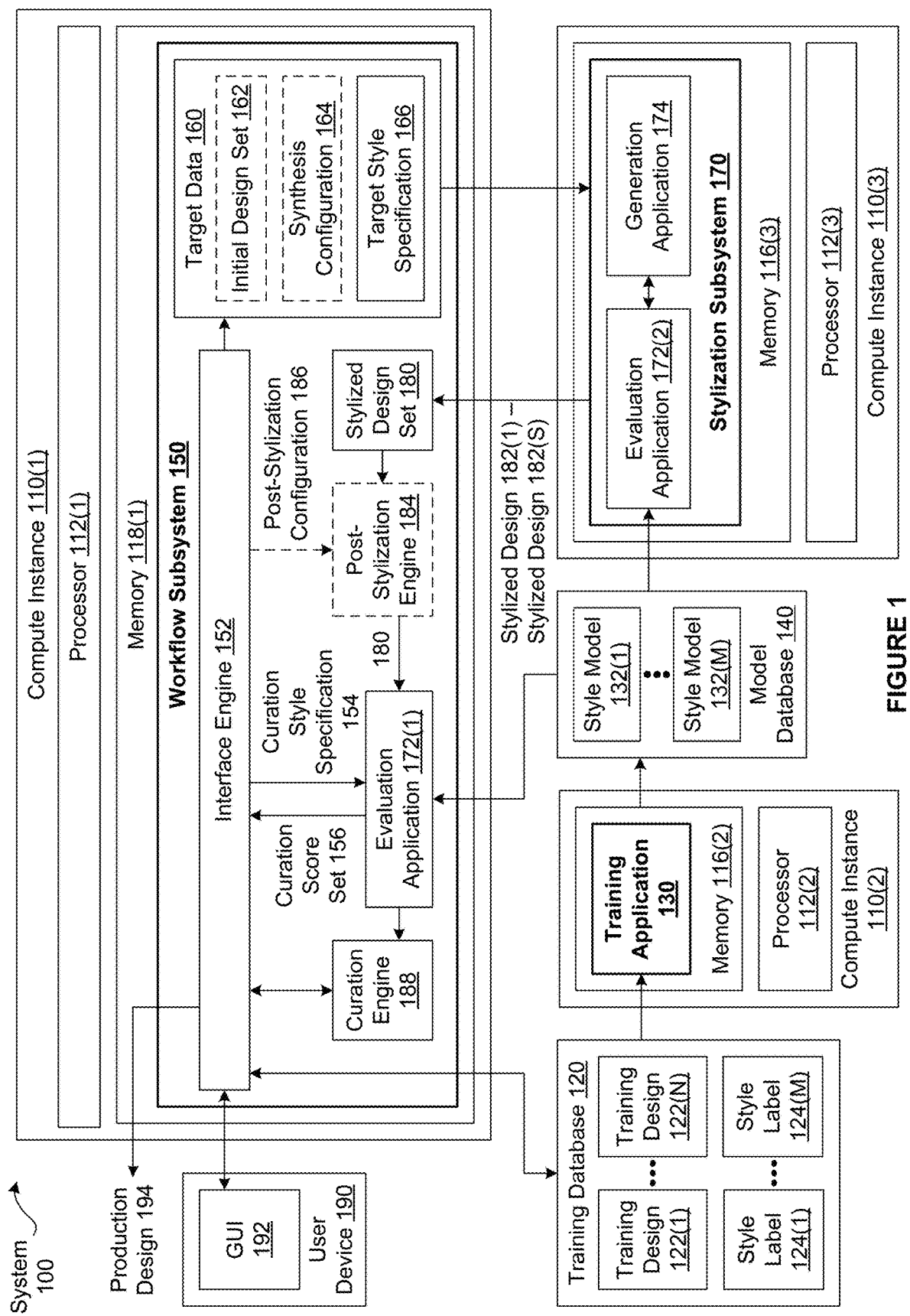
- FIG. 1 is a conceptual illustration of a system configured to implement one or more aspects of the present invention.

FIG. 1 is a conceptual illustration of a system 100 configured to implement one or more aspects of the present invention. The system 100 includes, without limitation, computer instances 110(1)-110(3), a user device 190, a training database 120, and a model database 140. For explanatory purposes, multiple instances of like objects are denoted with reference numbers identifying the object and parenthetical numbers identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110, any number of user devices 190, and any number and type of databases in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of the compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(1) is configured to provide a workflow that trains machine learning models based on training designs having associated style(s) and uses any number of trained machine learning models to account for stylistic preferences when automatically generating and evaluating designs. Each design represents, without limitation, any number and type of objects digitally in any technically feasible fashion. For instance, in some embodiments, one or more designs are computer-aided design ("CAD") geometry models that represent the geometry of an object in any technically feasible fashion (e.g., volumetric, surface boundary, etc.) and format (e.g., mesh, boundary representation, etc.) that is suitable for design/manufacturing/processing. In other embodiments, any number of designs specify the position and orientation of any number of virtual objects (e.g., design primitives), where each virtual object digitally represents an associated object. In some embodiments, any number of designs specify 3D shapes as point clouds. In various embodiments, any number of designs are 3D images or two-dimension ("2D") images of objects. Each 2D or 3D image may be a hand drawing, a sketch, a photo, a frame of a video, etc.

A typical conventional design process for generating a design for an object while taking into account stylistic preferences is primarily manual. A designer manually generates an initial design that reflects the desired style of the object and then manually modifies the initial design to generate a production design that meets functional aspects of the object. One drawback of a manual design process is that generating and modifying the initial design can be tedious and prohibitively time-consuming. If the time allocated for design activities is limited, then the designer may be able to consider only a limited number of design options during the design process, which can reduce the overall quality of the production design. Additionally, many novice designers are unable to generate designs manually that have a desired style without assistance from more experienced designers who are familiar with that particular style.

In an attempt to reduce the time required for design activities, some designers use a conventional generative design process. The designer configures a generative design application to generate a generative design space that includes a vast number (e.g., thousands) of designs that satisfy functional goals and constraints. The designer subsequently explores the generative design space, manually viewing and evaluating the different generated designs and eventually selecting a single, final design for additional design and/or manufacturing activities. One drawback of using a conventional generative design process is that the resulting designs oftentimes have organic shapes that are aesthetically unappealing or expensive/difficult to manufacture. Because of the prevalence of organic shapes in a typical generative design space, oftentimes none of the designs generated via a conventional generative design process are aesthetically acceptable to the designer. Further, even if a particular design generated via a conventional generative design process is aesthetically acceptable to the designer, manufacturing the organic shapes included in the design is usually inefficient.

Instituting a Workflow for Stylizing Designs

To address the above problems, the compute instance 110(1) implements a workflow subsystem 150, the compute instance 110(2) implements a training application 130, and the compute instance 110(3) implements a stylization subsystem 170. The workflow subsystem 150 resides in the memory 116(1) and executes on the processor 112(1), the training application 130 resides in the memory 116(2) and executes on the processor 112(2), and the stylization subsystem 170 resides in the memory 116(3) and executes on the processor 112(3). Together, the workflow subsystem 150, the training application 130, and the stylization subsystem 170 institute a "stylization workflow" that accounts for stylistic preferences when generating and curating any number of stylized designs 182. The workflow subsystem 150 is also referred to herein as the "workflow application."

The stylization workflow includes, without limitation, a training phase, an inspiration stage, a design generation phase, and a curation phase. The stylization workflow may be used to generate and evaluate any number of stylized designs 182 for any industry and for any purpose. For instance, the stylization workflow may be used in industrial design to design furniture, tools, gadgets, etc. The stylization workflow may be used in architectural design to design facades, etc. The stylization workflow may be used in civil design to design bridges, roads, and the like. Importantly, the stylization workflow may be used to increase manufacturability of existing designs or generate stylized designs 182 that are suitable for a particular manufacturing technique.

Each of the stylized designs 182 is a design that is generated based on at least one target stylistic trait. As referred to herein, a "stylistic trait" may be any perceptible property and/or manufacturing-related property that characterizes a group of designs. Aesthetic traits are perceptible properties that characterize a group of designs and are therefore a subset of stylistic traits. A manufacturing-related property is associated with manufacturing physical object(s) based on a design. Each stylistic trait may be associated with a label that identifies the stylistic trait. Some examples of labels for stylistic traits are "bold," "powerful," "intricate," "skinny," "organic," and "sharp." Examples of stylistic traits include, but are not limited to:

Material and material properties, such as color, texture, reflection, diffusion, specular, and other surface finish attributes that affect appearance and/or the texture of surfaces.

Edge and corner sharpness, angles, and curvatures.

Surface curvatures (e.g., doubly or singly curved, Gauss curvature, mean curvature, principle curvatures, etc.) and their distributions and statistics.

Corner normals, edge normals, surface normals, and associated distributions and statistics.

Minimum, maximum, distributions, proportions, and statistics (e.g., mean, median, etc.) of feature sizes and thicknesses.

Topological properties of a shape, such as the genus of the shape, statistical characteristics of the topological network (i.e., skeleton) of the shape and/or statistical characteristics of the geometries of the topological network.

Combinations, repetitions, symmetries, and patterns of any number of perceptual properties and/or other stylistic traits, such as bi-grams (i.e., local combinations of properties) and associated correlations, joint probabilities, and statistics.

Other subjective or objective, local or global, perceptual characteristics that may not necessarily be defined geometrically or mathematically but can be captured from the 2D or 3D representations of shapes and surfaces using machine-learning techniques.

Other subjective or objective, local or global, characteristics related to the manufacturability or perceived manufacturability (i.e., with particular manufacturing processes and fabrication methods, machines, and/or tool sets) of objects and surfaces.

As referred to herein, a "style" or a "design language" is an aggregation of stylistic traits that are common between all designs in a collection of designs. Notably, a style may apply to designs associated with different classes of objects having different functionalities. For example, a design of a chair and a design of a motorcycle that have similar local curvatures and surfaces may belong to the same style. Collections of designs may be defined in any technically feasible fashion. For example, a collection of designs could include designs associated with the same era, designer, company, brand, franchise, shop, manufacturing machine, manufacturing process, and/or manufacturing tool set.

A style may be associated with a sense of character, identity, cultural/social background, and/or manufacturing commonality (e.g., a manufacturing machine, a manufacturing tool, a manufacturing tool set, a manufacturing method, etc.). For example, one style could encapsulate a "streamlined" appearance that a particular company is known for. Another style could express commonalities between a set of parts that can be manufactured efficiently with a particular Computer Numerical Control (CNC) milling machine. Any number of styles may be well-known (e.g., Art Deco, Art Nouveau, etc.).

As shown, the workflow subsystem 150 includes, without limitation, an interface engine 152, target data 160, a stylized design set 180, a post-stylization engine 184, an evaluation application 172(1), and a curation engine 188. The interface engine 152 may operate on any type of data received in any technically feasible fashion. Further, the interface engine 152 may implement any number and type of privacy features. For instance, in various embodiments, the interface engine 152 ensures that the data associated with each designer is not shared with other designers. In the same or other embodiments, the interface engine 152 allows each designer to shared data with any number of other designs (e.g., within a working group or a company). In some embodiments, the interface engine 152 allows each designer to store and/or share data, such as the training database 120 and/or the model database 140, with other designers via a private cloud, a public cloud, or a semi-private cloud.

The interface engine 152 generates a graphical user interface (GUI) 192, displays the GUI 192 on the user device 190, and receives input via the GUI 192. The user device 190 may be any type of device that is capable of transmitting input data and/or displaying visual content. For example, the user device 190 could be a game console, a smartphone, a smart television (TV), a laptop, a tablet, or a desktop computer. The GUI 192 enables any number of designers to execute any of the phases in the stylization design flow any number of times in any order in any technically feasible fashion. For example, the GUI 192 could provide a different execution button for each phase and, at any given time, disable the execution buttons for phases requiring additional information.

In the training phase, the interface engine 152 generates the training database 120 based on input received via the GUI 192. The training database 120 includes, without limitation, any number of training designs 122 and any number of style labels 124. Each of the training designs 122 may be any design associated with any type(s) of object(s). Each of the style labels 124 is an identifier (e.g., a string) that refers to a particular style or stylistic trait. Some examples of style labels 124 are "minimalist," "Art-Deco," "Art-Nouveau," "Apple laptop styles circa 2010", "Leica cameras circa 1960," "2.5D 3-Axis CNC".

Each of the training designs 122 is associated with one or more style labels 124 in any technically feasible fashion. Further, each of the style labels 124 may characterize different types of designs across different classes of objects. For example, the style label 124 "Art-Deco" could be associated with each of the training designs 122(1)-122(3). The training design 122(1) could be an image of a building, the training design 122(2) could be a CAD geometry model of a car, and the training design 122(3) could be a sketch of a chair entered by the designer via the GUI 192.

The interface engine 152 may generate the training database 120 in any technically feasible fashion. For instance, in some embodiments, a designer specifies one or more designs (e.g., a directory of designs, a single design, etc.) and a style label 124 via a training configuration pane in the GUI 192. If the specified style label 124 is not already included in the training database 120, then the interface engine 152 adds the selected style label 124 to the training database 120. For each specified design, the interface engine 152 adds the specified design as a new training design 122 to the training database 120 and associates the new training design 122 with the specified style label 124.

In the same or other embodiments, a designer specifies one or more designs, any number of negative style labels 124, and any number of positive style labels 124 via a training configuration pane in the GUI 192. A positive style label 124 indicates that each of the specified designs belongs to the associated style. A negative style label 124 indicates that each of the specified designs does not belong to the associated style. The interface engine 152 adds the specified style labels 124 that are not already included in the training database 120 to the training database 120. For each specified design, the interface engine 152 adds the specified design as a new training design 122 to the training database 120, associates the new training design 122 in a positive manner to each of the positive style labels 124, and associates the new training design 122 in a negative manner to each of the negative style labels 124.

Upon receiving a request to train the style model 132 from a designer via the GUI 192, the interface engine 152 provides the training database 120 to the training application 130. The training application 130 performs any number and type of supervised machine-learning techniques to generate the style model 132 based on the training database 120. In alternate embodiments, the training application 130 may generate or re-generate the style model 132 based on the training database 120 in response to any type of trigger. For example, in some embodiments, the training database 120 is continually updated and the training application 130 is configured to re-generate the style model 132 based on the training database 120 every twenty-four hours.

The training application 130 trains the style model 132 to map a design to characterization information associated with one or more of the style labels 124. As referred to herein, characterization information may include, without limitation, any number and combination of probabilities, assignments, Boolean values, scores, etc. For instance, in some embodiments, the characterization information for a design is a probability distribution over the style labels 124 included in the training database 120. For each of the styles represented by the style labels, the probability distribution estimates a likelihood that the design belongs to the style. In other embodiments, the characterization information specifies a single style label 124 that is associated with the style to which the design is predicted to belong. In yet other embodiments, the characterization information includes a Boolean value for each of the style labels 124. The Boolean value for a particular style 124 predicts whether the design belongs to the style represented by the associated style label 124. In alternate embodiments the characterization information may also include any number of gradients (e.g., derivatives/sensitivities) with respect to design specifications/parameters/variations.

The style model 132 may be any type of model including, without limitation, a binary classification model, a multiclass classification model, and a regression model. The style model 132 may be trained using any number of the training designs 122 included in the training database 120 to make predictions associated with any number of the training labels 124. For instance, a binary classification model associated with a given style label 124 predicts whether a design belongs to the style associated with the style label 124. A multiclass classification model predicts a probability distribution for a design across at least two of the style labels 124. A regression model associated with a given style label 124 predicts a numeric value that indicates the similarity between the style of a design and the style associated with the style label 124.

After training, the training application 130 adds the style model 132 to the model database 140. The model database 140 may include any number and type of style models 132 that are generated in any technically feasible fashion. Each of the style models 132 may be any type of executable software that maps a design to characterization information in any technically feasible fashion based on any number of stylization algorithms. If the style model 132 is trained via machine-learning techniques, then the stylization algorithms are determined during the training process. Notably, each of the style models 132 can map a design associated with any class of objects to characterization data. Notably, if the style model $132(x)$ is trained via machine-learning techniques using the training database 120, then the style model $132(x)$ can reliably map a design associated with a particular class of objects to characterization data irrespective of whether any of the training designs 122 are associated with the class of objects.

In alternate embodiments, the training application 130 may generate multiple style models 132 based on the training database 120, where each of the style models 132 classifies designs based on a different subset of the style labels 124 and/or training designs 122. In the same or other embodiments, the training application 130 generates any number of style models 132 based on any number of training databases 120 that are acquired (e.g generated or retrieved from any accessible memory) in any technically feasible fashion.

In alternate embodiments, the interface engine 152 and the training application 130 may perform any number and type of operations in conjunction with any number of other software applications to generate any number of style models 132 in any technically feasible fashion. For instance, in an element-based training, the interface engine 152 generates the training database 120 that includes design elements and associated style labels 124. The interface engine 152 receives input specifying design elements (e.g., edges, surfaces, etc.) in any number of designs and any number of positive and/or any number of negative style labels 124. A positive style label 124 specifies that the presence of each of the specified design elements in a design indicates that the design belongs to the associated style. A negative style label 124 specifies that the presence of each of the specified design elements in a design indicates that the design does not belong to the associated style.

In some embodiments, the training application 130 performs semi-supervised machine-learning operations to generate any number of style models 132 based on any number of the training designs 122 and any amount of designer input. For instance, in some embodiments, the training application 130 executes any number and type of unsupervised learning techniques, such as clustering, or applies any amount of previous training and knowledge to group the training designs 122 into different styles (labeled or unlabeled groups). Based on the groups, the training application 130 may then cluster new training designs 122 into groups, discover new groups, and suggest the style labels 124 for the groups. The interface engine 182 may display the suggested style labels 124 for the groups via the GUI 192 and allow a designer to review and correct the suggested style labels 124. The interface engine 182 may enable a designer to review and correct the suggested style labels 124 via the GUI 192 in any technically feasible fashion. For example, the GUI 192 could include graphical widgets that enable the design to add and/or edit the suggested style labels 124, drag and drop a group into another group to merge groups and the associated suggested style labels 124, etc.

In various embodiments, the training application 130 performs any number and type of unsupervised machine-learning operations in addition to any number of supervised machine-learning operations to generate any number of style models 132. In some embodiments, the training application 130 may perform data mining operations to acquire the training designs 122 from the web or any other resource (e.g., data lakes, etc.) without human intervention. Further, the training application 130 may determine any number of relationships between the training designs 122 and any number of style labels 124 based on any amount and type of data or metadata.

For example, the training application 130 could determine the relationships between training designs 122 that are images and any number of style labels 124 based the proximity and relation of words in textual data (that may be potential style labels 124) to the images on web pages. In another example, the training application 130 could search for images associated with certain words (e.g., "bold," "strong," "intricate," etc.) via an internet search engine, or similar technology, and then use the mined images as training designs 122 or to provide additional data for any number of machine-learning operations. In the same or other embodiments, the training application 130 may perform data mining operations to determine any number of relationships between designs, potential training designs 122, and training designs 122.

In alternate embodiments, any number of the style models 132 may be pre-trained. In the same or other embodiments, the training application 130 may perform any number and type of operations that customize any number of pre-trained style models 132 based on any amount and type of input received via the GUI 192 and the interface engine 152. In various embodiments, the training application 130 may periodically perform any number of data mining operations to update any amount of training data (including the training database 120) and re-generate any number of style models 132 based on the newly acquired training data.

In alternate embodiments, the training database 120 may be replaced or supplemented with any type of method for acquiring training data. For example, in some embodiments, the training application 130 implements Federated Learning techniques to generate one or more style models 132. As persons skilled in the art will recognize, "Federating Learning" is a collaborative machine-learning technique that decentralizes the training process in a way that allows different users to train a single model with user-specific private data (e.g., the training designs 122) without actually sending the data to a central training process, thereby maintaining privacy.

The model database 140 may include any number and types of style models 132 and may be stored in any technically feasible fashion. For instance, the model database 140 could be stored in the memory 116 one of the computer instance 110(1)-110(3), the memory 116 of any other compute instance 110 such as a model server, a private cloud, a public cloud, a semi-private cloud, a content delivery network ("CDN"), etc. Access to each of the style models 132 included in the model database 140 may be open (i.e., accessible to any designer) or may be restricted in any technically feasible fashion to a specific group of designers.

In various embodiments, the training application 130 may implement any number and type of machine-learning algorithms in any technically feasible fashion to determine any number and type of style labels 124 and/or generate any number and type of style models 132. Examples of machine-learning techniques include, without limitation, the following types of algorithms: support vector machines ("SVMs"), artificial neural networks (including deep learning), Bayesian networks, genetic algorithms, regression, decision trees, random forests, gradient boosting, k-nearest neighbors, k-means, long short-term memory ("LSTM") and/or other recurrent neural network ("RNN"), etc.

In the target style specification stage, the interface engine 152 interacts with a designer via the GUI 192 to generate the target data 160 that guides the behavior of the stylization subsystem 170, also referred to herein as the "stylization application." The target data 160 includes, without limitation a target style specification 166. As depicted in dotted boxes, the target data 160 may also include, without limitation, an initial design set 162 or a synthesis configuration 164.

The target style specification 166 indicates any number of style preferences in any technically feasible fashion that is consistent with the style labels 124 and the stylization subsystem 170. The interface engine 152 may generate the target style specification 166 in any technically feasible fashion. For instance, in some embodiments, the designer selects any number of the style labels 124 as individual positive targets and any number of other style labels 124 as individual negative targets via the GUI 192. In response, the interface engine 152 generates the target style specification 166 that causes the stylization subsystem 170 to attempt to generate designs that, with respect to style, belong to at least one of the positive targets and do not belong to any of the negative targets.

In other embodiments, the designer selects any number of the style labels 124 as a combined positive target and, in response, the interface engine 152 generates the target style specification 166 that causes the stylization subsystem 170 to attempt to generate designs that, with respect to style, belong to all of the positive targets. For example, the designer could select a combined positive target of "company xyz" and "CNC machine X." In response, the interface engine 152 would generate the target style specification 166 that causes the stylization subsystem 170 to attempt to generate designs that are characteristic of company xyz and can be efficiently generated using the CNC machine X.

In some embodiments, the stylization subsystem 170 modifies an initial design based on the target style specification 166 to generate one or more stylized designs 182. In such embodiments, the target data 160 includes the initial design set 162 that specifies any number of initial designs. In other embodiments, the stylization subsystem 170 generates the stylized designs 182 based on the target style specification and the synthesis configuration 164. The synthesis configuration 164 specifies any amount and type of control items that impact the behavior of a synthesis algorithm and are not directly related to a style. For instance, the synthesis configuration 164 may specify, without limitation, any number and type of optimization criteria, design constraints, objectives, regularization values, and bias values in any combination.

The control items may be related to physical and/or mechanical performance (e.g. stiffness, displacement, stress, strain, heat dissipation, weight, mass, center of gravity, stability, buckling, natural frequencies, etc.), environmental impact, energy efficiency, ergonomics, manufacturing time and costs, running costs, life-cycle costs, etc. For example, the synthesis configuration 164 for designing a lamp could include an objective to maximize the amount of visible light emitted from the lamp, an objective to minimize the weight of the lamp, and a mechanical stability constraint that constrains the projection of the center of gravity of the lamp to be inside the footprint of the lamp. The stylization subsystem 170 may perform any number and type of optimization or editing operations to generate the stylized designs 182 that reflect the synthesis configuration 164 and the target style specification 166.

Advantageously, the interface engine 152 may configure the GUI 192 to enable the designer to efficiently specify the target data 160 in any technically feasible fashion. For instance, in various embodiments, the interface engine 152 displays any number of the style labels 124 along with thumbnails of the training designs 122 belonging to the associated style to facilitate the generation of the target style specification 166. In the same or other embodiments, the interface engine 152 enables the designer to select and/or sketch via the GUI 192 any number of initial designs included in the initial design set 162 and/or any number of optimization criteria and/or constraints specified in the synthesis configuration 164.

In alternate embodiments, the target data 160 includes any number of core elements (not shown) as additional objective(s) or constraint(s) that guide the behavior of the stylization subsystem 170. The core elements are either constraints or recommendations for generating the stylized designs 182. The core elements are global key points, lines, curves, corners, edges, profiles, and/or surfaces that encapsulate some general stance, feeling, or character for a class of objects. If some of the surfaces, edges and key features of a design follow the core elements for the associated class of object, then the design conveys a certain character.

In contrast with a style, core elements for a particular class of objects are dependent on a functional aspect of the class of object and, consequently, the relevance and applicability of core elements is limited to the class of objects. For example, the core elements for a motorcycle could define an overall appearance via two circles representing wheels, a triangle representing the engine and seat that is connected to the rear wheel, and a line connecting the front wheel to the triangle that extends to the handlebars. If the design of a motorcycle complies with the core elements, then the overall appearance of the design conveys a desired character (e.g., fast, powerful, etc.). However, the design of another object (e.g., a boat or a truck) that complies with the same core elements does not necessarily convey the designed character.

During the inspiration phase, the interface engine 152 may determine the core elements in any technically feasible fashion. For instance, in some embodiments, the interface engine 152 enables the designer to specify (e.g., sketch) the core elements via the GUI 192 in a stand-alone fashion or superimposed on an existing design (e.g., one of the training designs 122). In other embodiments, a core element extraction application (not shown) implements any number of machine-learning techniques to generate any number of core elements based on the subset of the training designs 122 associated with a selected class of objects and a selected style label 124. In some embodiments, the core element extraction application may generate a set of core elements based on a selected set of designs and then assign a style label 124 to the set of core elements. Subsequently, the core element extraction application may automatically generate new core elements based on additional designs that are associated with the style label 124.

To initiate the design generation phase, the workflow subsystem 150 selects one or more of the style models 132 from the model database 140 in any technically feasible fashion. For instance, in some embodiments, the workflow subsystem 150 selects the style model(s) 132 based on designer input received via the GUI 192 and the interface engine 152. In other embodiments, the workflow subsystem 150 compares the style labels 124 that each of the style models 132 has learned to the style labels 124 that are referenced in the target style specification 166. As referred to herein, the style labels 124 that a given style model 132($x$) has "learned" are the style labels 124 included in the training database 120($x$) that the training application 130 used to train the style model 132($x$). The workflow subsystem 150 then selects the style model(s) 132 that, together, have learned the style labels 124 that are referenced in the target style specification 166.

If the target data 160 includes the initial design set 162, then the workflow subsystem 150 executes the design generation phase separately for each of the initial designs included in the initial design set 162 and aggregates the resulting stylized designs 182 into the stylized design set 180. To execute the design generation phase for an initial design, the workflow subsystem 150 configures the stylization subsystem 170 to generate stylized designs 182 based on the target style specification 166, the selected style model(s) 132, and the initial design. If, however, the target data 160 does not include the initial design set 162, then the workflow subsystem 150 configures the stylization subsystem 170 to generate the stylized designs 182 included in the stylized design set 182 based on the target style specification 166 and the synthesis configuration 164.

During the design generation phase, the stylization subsystem 170 generates any number of stylized designs 182 based on the selected style model(s) 132 and either the synthesis configuration 164 or one of the initial designs included in the initial design set 162. As shown, the stylization subsystem 170 includes, without limitation, the evaluation application 172(2) and a generation application 174. Together, the evaluation application 172(2) and the generation application 174 generate the stylized designs 182 in an iterative design process.

Figure 2:
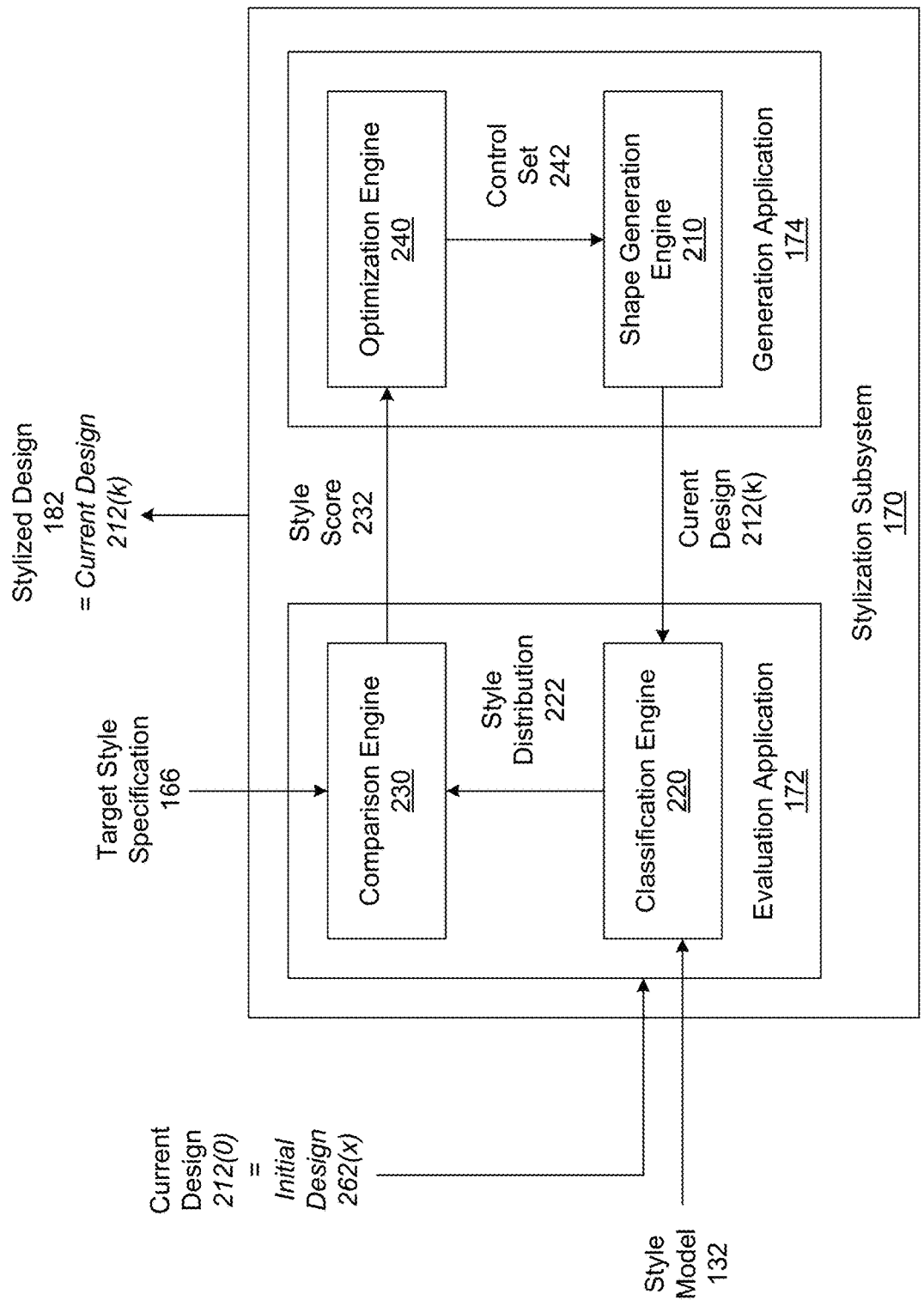
FIG. 2 is a more detailed illustration of the stylization subsystem of FIG. 1, according to various embodiments of the present invention.
Figure 3:
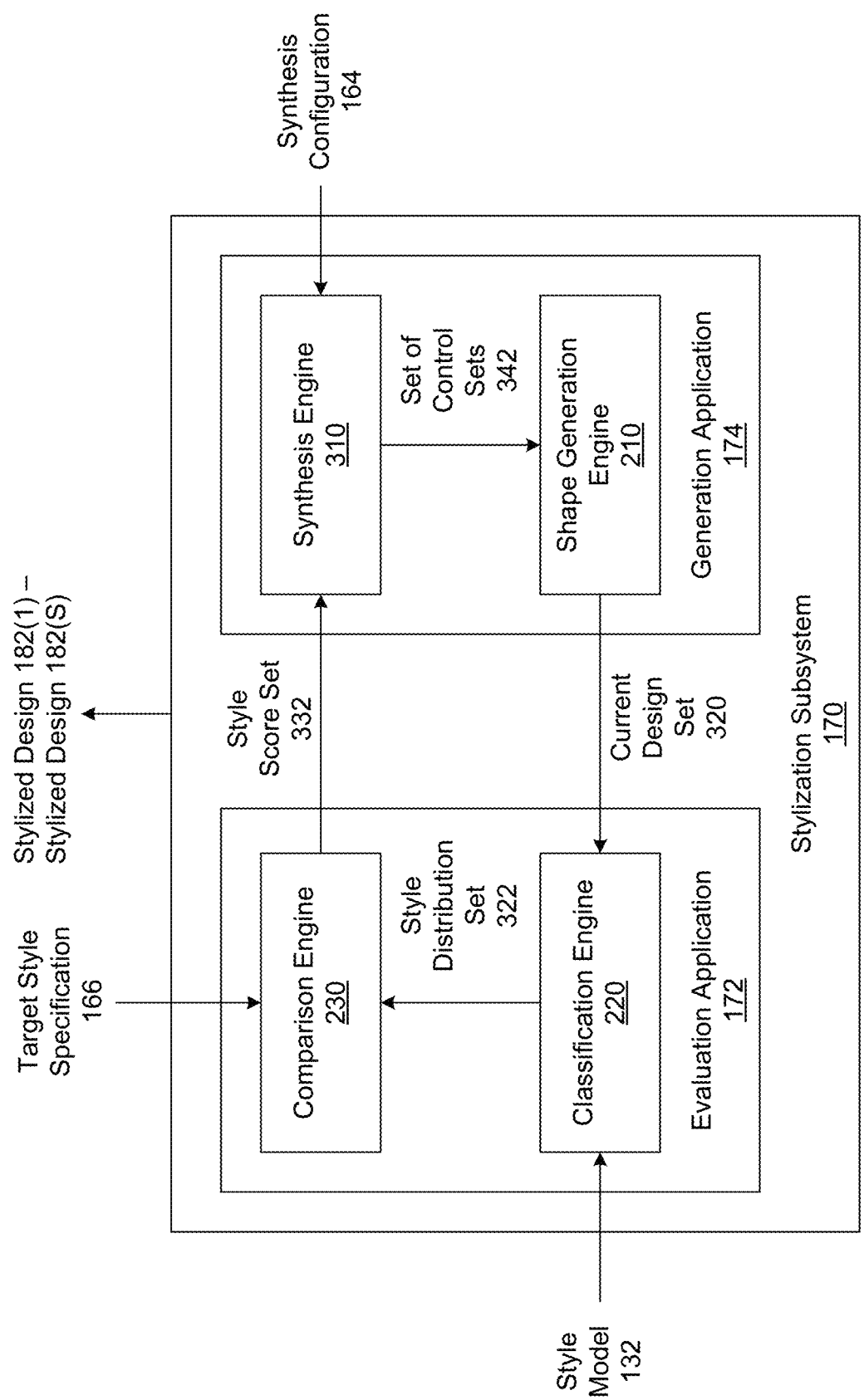
FIG. 3 is a more detailed illustration of the stylization subsystem of FIG. 1, according to other various embodiments of the present invention.

As described in greater detail in conjunction with FIGS. 2 and 3, the evaluation application 172(2) receives a current design and computes a style score for the current design based on the target style specification 166 and the selected style models 132. First, the evaluation application 172 computes characterization information for the current design based on the selected style model(s) 132. More precisely, for each of the selected style models(s) 132, the evaluation application 172 provides the current design as an input to the selected style model 132. The output of the selected style model 132 is model-specific characterization information associated with the style labels 124 that the selected style model 132 has learned. The evaluation application 172 then aggregates the model-specific characterization information in any technically feasible fashion to generate the characterization information for the current design.

Subsequently, the evaluation application 172(2) computes a style score for the current design based on the characterization information and the target style specification 166. The style score for a current design is a value for a style metric that indicates a level of compliance that the current design has with the target style specification 166. The evaluation application 172(2) may compute the style score in any technically feasible fashion. For instance, in some embodiments, the characterization information is a probability distribution and the evaluation application 172(2) compares each of the probabilities included in the style distribution to the target style specification 166 based on the associated style labels 124. If the target style specification 166 specifies the style label 124($x$) as a positive target, then the evaluation application 172(2) increases the style score as the probability associated with the style label 124($x$) increases. If the target style specification 166 specifies the style label 124($x$) as a negative target, then the evaluation application 172(2) decreases the style score as the probability associated with the style label 124($x$) increases. In alternate embodiments (e.g where the generation application 174 implements a gradient-based optimization algorithm), the style score may also include the gradients of the style score with respect to design specifications/variables/parameters that allow the generation application 174 to make the proper modifications to the design specifications/variables/parameters towards achieving the target style specification 166.

The generation application 174 generates one or more current designs based on the style score(s), any number of optimization algorithms, and any number of shape generation algorithms in any combination. An optimization algorithm may modify an existing design, synthesize a new design, generate a control set that configures a shape generation algorithm to modify an existing design, and/or generate a control set that configures a shape generation algorithm to synthesize a new design. A shape generation algorithm generates a design that includes any number of shapes based on a control set. The generation application 174 either modifies existing design content or synthesizes new design content.

If the generation application 174 receives an initial design from the workflow subsystem 150, then the generation application 174 modifies existing content. The generation application 174 sets a current design equal to the initial design and then performs an iterative design process that incrementally modifies the current design to generate one or more stylized designs 182. For each iteration, the evaluation application 172(2) computes style score(s) for the current design(s) based on the selected style model(s) 132 and the target style specification 166. The generation application 174 then modifies the current design(s) based on an objective of optimizing the style score(s). The generation application 174 may implement any number and type of optimization algorithms to modify the current design(s). For instance, the generation application 174 may perform any number and combination of topology optimization algorithms, parametric optimization algorithms, and constrained shape reconstruction algorithms.

After the final iteration, the generation application 174 transmits the current design(s) as stylized design(s) 182 to the workflow subsystem 150. In some embodiments, the generation application 174 may also transmit the style score(s) associated with the stylized design(s) 182 to the workflow subsystem 150. The workflow subsystem 150 then adds the stylized design(s) 182 to the stylized design set 180. FIG. 2 describes one embodiment of the stylization subsystem 170 that modifies existing design content in greater detail.

If, however, the generation application 174 does not receive an initial design, then the generation application 174 synthesizes new content based on the synthesis configuration 164. More specifically, the generation application 174 performs an iterative design process based on the synthesis configuration 164 and an objective of optimizing the style scores to generate the stylized designs 182. To initiate the iterative design process, the generation application 174 generates a current design set of one or more current designs based on the synthesis configuration 164. For each iteration, the evaluation application 172 computes a style score for each of the current designs included in the current design set. The generation application 174 then synthesizes a new current design set based on the style scores and the synthesis configuration 164. The generation application 174 may implement any number and type of optimization algorithms to synthesize new design content. For instance, the generation application 174 may implement any number and combination of generative design algorithms, evolutionary design algorithms, multi-objective optimization algorithms, etc.

After the final iteration, the generation application 174 transmits the current design(s) included in the current design set as the stylized designs 182 to the workflow subsystem 150. In some embodiments, the generation application 174 may also transmit the style score(s) associated with the stylized design(s) 182 to the workflow subsystem 150. The workflow subsystem 150 then adds the stylized design(s) 182 to the stylized design set 180. FIG. 3 describes one embodiment of the stylization subsystem 170 that synthesizes new design content in greater detail.

The stylization subsystem 170 may terminate the iterative design process based on any number and type of completion criteria. For instance, in some embodiments, the stylization subsystem 170 may terminate the iterative design process after a maximum number of iterations (e.g., 1,000) that is specified via the GUI 192. In the same or other embodiments, the stylization subsystem 170 may terminate the iterative design process when the average style score of the current design(s) is greater than a minimum style score (e.g., 95).

As a general matter, the stylization subsystem 170 may implement any number and type of optimization algorithms, synthesis algorithms, shape generation algorithms, and style metrics to generate any number of stylized designs 182 that reflect the target style specification 166. Accordingly, in various embodiments, the resulting stylized designs 182 may vary in shape, topology, performance, etc. Further, the generation application 174 may perform operations based on any amount of data generated during any number (including zero) of previous iterations. For instance, in some embodiments, the generation application 174 could execute a stochastic optimization algorithm (e.g., simulating annealing algorithm) to randomly generate minor modifications to be applied to a current design. In the same or other embodiments, for each current design, the generation application 174 could execute a gradient-based optimization algorithm (e.g., via back-propagation) to synthesize a new current design based on the current design. In various embodiments, the generation application 174 could implement an evolutionary algorithm (e.g., a genetic algorithm) to synthesize a new current design set based on a current design set.

In alternate embodiments, the stylization algorithm(s) encapsulated in one or more of the style models 132 may be replaced with any type of stylization algorithms expressed in any technically feasible fashion and the techniques described herein are modified accordingly. For instance, in some alternate embodiments, each of the style labels 124 is associated with a different style construction set that encapsulate one or more stylization algorithms and includes, without limitation, any number of design primitives, design elements, and design operations in any combination. The training database 120, the training application 130, the model database 140, the style models 132, and the stylization subsystem 170 are replaced with a "style construction subsystem." The style construction subsystem constructs the stylized designs 182 based on a target construction set that is determined based on the style construction sets and the target style specification 166.

In some embodiments, the style construction subsystem generates one or more of the style construction sets based, at least in part, on input received via the GUI 192. For example, the style construction subsystem could suggest a style construction set, including design parameter constraints, and an associated style label 124 via the GUI 192 and the interface engine 152. A designer may then edit and modify the style construction set and the associated style label 124 via the GUI 192 and the interface engine 152. In the same or other embodiments, the style construction subsystem may implement any number of machine-learning techniques to generate each of the style construction sets. For example, in some embodiments, the style construction subsystem implements an evolutionary algorithm to generate the style construction set for a specified style label 124 based on a specified set of training designs 122.

The design primitives may include, without limitation, any parts (including all) and/or combinations of any number of prisms, spheres, ellipsoids, cubes, cuboids, pyramids, truncated pyramids, cylinders, cones, truncated cones, etc. The design elements and the design operations may include, without limitation, profiles and cross-sections, swarf paths, fillets and bevels, revolutions, extrusions, Boolean operations (e.g., union, subtraction, intersection), and so forth. Any number of the design primitives, design elements, and design operations may be constrained in terms of any number of associated design parameters (e.g., size, length, radius, position, orientation, etc.). Each design parameter may be constrained to have specified relationships with any number of other design parameters, such as attachment relationships or alignment relationships. Each design primitive may be constrained to have specified relationships with global or local axis and origins. For example, each instance of a design primitive could be limited to positions and orientations that are parallel to a global ground plane.

The style construction subsystem may combine any number of style construction sets to generate the target construction set based on the target style specification 166 in any technically feasible fashion. Subsequently, the style construction subsystem may implement any number of optimization algorithms in any combination to generate the stylized designs 182 based on the target construction set. Examples of optimization algorithms include, without limitation, evolutionary optimization algorithms, stochastic optimization algorithms, real optimization algorithms, and mixed-integer optimization. The style construction subsystem may construct the stylized designs 182 in any technically feasible fashion. For instance, the style construction subsystem may implement a constructive solid geometry ("CSG") algorithm.

After the stylization subsystem 170 generates the stylized design set 180, the post-stylization engine 184 may further refine any number of the stylized designs 182 based on a post-stylization configuration 186. The post-stylization configuration 186 may include any number and type of objective and constraints. For instance, in some embodiments, the interface engine 152 interacts with the designer via the GUI 192 to determine any number of post-stylization objectives and constraints (e.g., physical performance) included in the post-stylization configuration 186. The post-stylization engine 184 then performs parametric optimization operations on each of the stylized designs 182 based on the post-stylization configuration 186.

In the curation phase, the workflow subsystem 150 evaluates, curates, and displays any number of the stylized designs 182 based on any amount and type of data. In various embodiments, the workflow subsystem 150 receives the style scores for the stylized designs 182 from the stylization subsystem 170. In the same or other embodiments, the workflow subsystem 150 configures the evaluation application 172(2) to generate a curation score set 156 based on a curation style specification 154. In alternate embodiments, the workflow subsystem 150 may generate any number of curation score sets 156 based on any number of curation style specifications 154.

To generate the curation score set 156, the interface engine 152 interacts with the designer via the GUI 192 to generate the curation style specification 154. The curation style specification 154 indicates any number of style-based criteria for visualization and other curation activities (e.g. filtering) based on the style labels 124 and the style models 132. In some embodiments, the interface engine 152 may initially set the curation style specification 154 equal to the target style specification 166 and then allow a designer to modify the curation style specification 152 via the GUI 192.

Subsequently, the workflow subsystem 150 selects any number of style models 132 included in the model database 140 with which to evaluate the stylized designs 182 based on the curation style specification 152. The workflow subsystem 150 may select the style models 132 in any technically feasible fashion. For instance, in some embodiments, the workflow subsystem 150 may implement any of the techniques described previously herein with respect to selecting the style model(s) 132 with which to evaluate current designs based on the target style specification 166. For each of the stylized design 182 included in the stylized design set 180, the evaluation application 172 computes a curation score based on the selected style model(s) 132 and the curation style specification 154 and adds the curation score to the curation score set 156. Note that the curation score for the stylized design 182(x) may differ from the style score for the stylized design 182(x) previously computed during the design generation phase.

The curation engine 188 interacts with a designer via the GUI 192 to perform any number of filtering, sorting, plotting, etc. operations that facilitate the evaluation of the stylized designs 182 based on any amount and type of data, including curation scores and style scores. For instance, in various embodiments, the interface engine may generate a display (presented via the GUI 192) showing a subset of the stylized designs 182 ordered according to the style scores and/or the curation scores. In the same or other embodiments, the curation engine 188 may sort, filter, cluster, and/or visually differentiate the stylized designs 182 based on the styles indicated via the style scores in any technically feasible fashion. Examples of visualization techniques that the curation engine 188 may implement to distinguish between different styles include, without limitation, color maps, grouping, axes rotation, radar maps, etc.

For example, the designer could configure the curation engine 188 to generate a plot in which each of the stylized designs 182 is represented as a different dot, where the color of the dot indicates the style for which the stylized design 182 has the highest probability of belonging. In another example, the designer could configure the curation engine 186 to generate a plot in which the horizontal axis could indicate a performance metric and one extreme of the vertical axis could indicate one style and the other extreme of the vertical axis could indicate another style (e.g., Art-Deco vs Art-Nouveau on the vertical axis.) In yet another example, the designer could configure the curation engine 186 to cluster the stylized designs 182 based on any number of the style labels 124 and then visually differentiate the clusters (e.g., using colors) for any number of other curation activities (e.g., plotting, sorting, etc.).

In alternate embodiments, the curation engine 188 may enable the designer to perform filtering and/or modification operations on any number of the stylized designs 182 based on one or more elements (e.g., edges, surface, etc.). For example, the designer could select one or more elements of one of the stylized designs 182 and then request that the workflow subsystem 150 filters, includes, or excludes stylized designs 182 based on the presence of the selected element(s).

In another example, the designer could select one or more elements for removal and the designer could select or the curation engine 188 could suggest one or more elements as a replacement. To suggest a replacement for an element, the curation engine 188 could re-execute the design generation phase with any number and type of potential replacement elements to determine the replacement element that best matches the target style specification 166. In response to a subsequent replacement request, the curation engine 188 could modify the stylized designs 182. Alternatively, the curation engine 188 could generate a constraint corresponding to the selected element(s) and requested operation (filtering, replacement, etc.), add the constraint to the synthesis configuration 164, and re-execute the design generation phase.

In alternate embodiments, the interface engine 152 receives bio-feedback of the emotions of the designer as designs are displayed via the GUI 192. The interface engine 152 may receive the bio-feedback from an electroencephalogram ("EEG") or any other brain-computer interface. The curation engine 188 may evaluate the bio-feedback to determine when the designer is focused on a particular design and/or a particular element of a particular design in any technically feasible fashion. In various alternate embodiments, the workflow engine 150 estimates the emotional and/or attention of the designer based on a machine-learning model (e.g., an RNN such as an LSTM). In various alternate embodiments, the interface engine 152 receives eye tracking information (e.g., eye saccades, pupillary response, etc.) and the workflow engine 150 estimates the emotions and/or focus of the designer based on the eye tracking information.

As part of the curation phase, the designer may select one or more designs as production design(s) 194. For example, the designer could select one of the stylized designs 182 as the production design 194. Alternatively, the designer could modify one of the stylized designs 182 and/or combine elements from multiple stylized designs 182 to generate a modified design and then select the modified design as the production design 194. The workflow subsystem 150 may execute any amount and type of activities to facilitate subsequent design and/or manufacturing activities based on the production design(s) 194. For instance, in some embodiments, the workflow subsystem 150 may generate any number of design files that represent the production design(s) 194 in a format and at a level of detail that is suitable for manufacturing by a selected manufacturing tool and/or process. The workflow subsystem 150 may then transmit the design files to the selected manufacturing tool and/or process.

At any point in time, the workflow subsystem 150 and/or the training application 130 may add new training designs 122 (e.g., any number of the stylized designs 182, designs acquired as part of data mining activities, newly entered designs, manually modified stylized designs 182, etc.) and/or style labels 124 to any number of training databases 120. Further, the training application 130 may re-execute the training phase to generate and/or re-generate any number of style models 132 based on any number of training databases 120 in response to any type of trigger. For instance, in some embodiments, the training application 130 is configured to re-generate each of the style models 132 included in the model database 140 daily. In other embodiments, the training application 130 automatically re-generates any associated style models 132 when the training database 120 is updated.

The workflow subsystem 150 enables any number of designers to execute any number of phases of the stylization workflow in any order and any number of times (including zero). For example, using the GUI 192(1) displayed on the user device 190(1), a first designer could execute the training phase to generate the style model 132(1) stored in the model database 140. Subsequently, using the GUI 192 displayed on the user device 190(2), a second designer could execute the inspiration phase to generate the target data 160, execute the design generation phase to generate the stylized design set 180, and then execute the curation phase to evaluate the stylized design set 180. During the curation phase, the second designer could determine that the style scores associated with the style label 124(1) were not accurate. The second designer could then execute the training phase to add additional designs (e.g., any number of the stylized designs 182) to the training database 120 as positive and negative examples of the style label 124(1) and re-generate the style model 132(1). The second designer could skip the inspiration phase and re-execute the design generation phase based on the previous target data 160 to generate a new stylized design set 180. Finally, the second designer could re-execute the curation phase and select one of the stylized designs 182 included in the new stylized design set 180 as the production design 194.

Advantageously, the workflow subsystem 150 reduces the time required to generate and evaluate stylized designs 182 based on stylistic preferences. In particular, using the style models 132, the designers can automatically generate and evaluate the stylized designs 182 based on style metrics instead of manual modifying and visual scrutinizing designs. By reducing the time required to generate and evaluate the stylized designs 182 relative to conventional design techniques, the workflow subsystem 150 allows designers to generate and evaluate a larger number of designs having the preferred stylistic traits in a given amount of time. The overall quality of the production design 194 can, therefore, be improved. Further, novice designers can implement the automated stylization workflow successfully, without assistance from more experienced designers.

It will be appreciated that the system shown herein is illustrative and that variations and modifications are possible. The connection topology, including the number, location, and arrangement of training databases 120, model databases 140, user devices 190, and compute instances 110 may be modified as desired. In certain embodiments, one or more components shown in FIG. 1 may not be present.

Note that the techniques described herein are illustrative rather than restrictive, and may be altered without departing from the broader spirit and scope of the invention. In particular, the flow subsystem 150, the training application 130, the stylization subsystem 170, the evaluation application 172, the generation application 174, the post-stylization engine 184, and the curation engine 188 may be implemented in any number of software applications in any combination. Further, in various embodiments, any number of the techniques disclosed herein may be implemented while other techniques may be omitted in any technically feasible fashion.

Generating Stylized Designs

FIG. 2 is a more detailed illustration of the stylization subsystem 170 of FIG. 1, according to various embodiments of the present invention. In particular, the stylization subsystem 170 depicted in FIG. 2 iteratively modifies the initial design 262(x) included in the initial design set 162 based on the style model 132 to generate a single stylized design 182. In alternate embodiments, the stylization subsystem 170 may generate any number of stylized designs 182 based on the initial design 262(x) and any number of style models 132. Further, for each of the initial designs 262 included in the initial design set 162, the stylization subsystem 170 may generate a different number of stylized designs 182. For explanatory purposes only, the parenthetical number associated with each of the current design 212, a control set 242, a style distribution 222, and a style score 232 specifies an associated design iteration. For example, the current design 212(67) is generated during the $67^{th}$ iteration.

As shown, the stylization subsystem 170 includes, without limitation, the evaluation application 172 and the generation application 174. In operation, the stylization subsystem 170 sets a current design 212(1) equal to the initial design 262(x). The evaluation application 172 and the generation application 172 then execute an iterative design process that incrementally modifies the current design 212 (1) to generate the stylized design 182.

For the $k^{th}$ iteration, the evaluation application 172 generates the style score 232(k) based on the current design 212(k), the target style specification 166, and the style model 132. The evaluation application 172 includes, without limitation, a classification engine 220 and a comparison engine 230. The classification engine 220 generates the style distribution 222(k) based on the current design 212(k) and the style model 132. More precisely, the classification engine 220 provides the current design 212(k) as an input to the style model 132. The output of the style model 132 is the style distribution 222(k). The style distribution 222(k) specifies estimated probabilities of the current design 212(k) belonging to the different styles associated with the style labels 124 that the style model 132 learned during the training phase. In alternate embodiments, the output of the style model 132 may be any type of characterization information and the techniques described herein are modified accordingly.

As shown, the comparison engine 230 generates the style score 232(k) based on the style distribution 222(k) and the target style specification 166. The style score 232(k) is a value for a style metric that indicates a level of compliance that the current design 212(k) has with the target style specification 166. The comparison engine 230 may institute any style metric and determine the style score 232(k) in any technically feasible fashion.

For instance, in some embodiments, the comparison engine 230 compares each of the probabilities included in the style distribution 222(k) to the target style specification 166 based on the style labels 124 included in the target style specification 166. If the target style specification 166 specifies the style label 124(x) as a positive target, then the comparison engine 230 increases the style score 232(k) as the probability associated with the style label 124(x) increases. If the target style specification 166 specifies the style label 124(x) as a negative target, then the comparison engine 230 decreases the style score 232(k) as the probability associated with the style label 124(x) increases.

The stylization subsystem 170 then determines whether to continue iterating based on any number and type of completion criteria (not shown). Some examples of completion criterion include, without limitation, a maximum number of iterations (e.g., 1,000), a minimum style score 232 (e.g., 95), a maximum amount of time, etc. The completion criteria may be specified in any technically feasible fashion. For instance, in some embodiments, the completion criteria are specified via the GUI 192. In alternate embodiments, the stylization subsystem 170 may determine whether to continue iterating at any point in the design process. For example, the stylization subsystem 170 could determine to cease iterating after the generation application 174 generates the current design 212(800).

If the stylization subsystem 170 determines to continue iterating, then the generation application 174 modifies the current design 212(k) to generate the current design 212(k+1). The generation application 174 includes, without limitation, an optimization engine 240 and a shape generation engine 210. The optimization engine 240 executes any number and type of optimization operations based on the style score 232(k) to generate the control set 242(k+1). For instance, the optimization engine 240 may execute any number and combination of topology optimization, parametric optimization, and constrained shape reconstruction operations.

In alternate embodiments, the optimization engine 240 may perform optimization operations based on the style score 232 and any amount of additional data in any technically feasible fashion. For instance, in some embodiments, the optimization engine 240 may perform gradient-based optimization operations based on the style score 232($k$), any number of previously generated current designs 212, and any number of previously generated style scores 232.

The control set 242($k$+1) includes any amount and type of data that configures the shape generation engine 210 to generate the current design 212($k$+1) in any technically feasible fashion. For instance, in some embodiments, the control set 242 may specify any number of parameters and/or any number of geometry generation commands that enable the shape generation engine 210 to generate the current design 212($k$+1) independently of the current design 212($k$). In other embodiments, the control set 242 may specify any number of parameters and/or any number of geometry modification commands that enable the shape generation engine 210 to modify the current design 212($k$) to generate the current design 212($k$+1). In alternate embodiments, the optimization engine 240 generates the current design 212($k$+1) without generating the control set 242($k$+1) and the shape generation engine 210 is omitted from the generation application 174.

The shape generation engine 210 generates the current design 212($k$+1) in any technically feasible fashion based on the control set 242($k$+1) and any amount (including none) of additional information. For instance, in some embodiments, the shape generation engine 210 may implement any number and combination of layout generation, shape generation, and parameterization operations to generate the current design 212($k$+1) without referencing the current design 212($k$). In other embodiments, the shape generation engine 210 may implement any number and combination of layout, shape, and parameter modification operations to modify the current design 212($k$) to generate the current design 212($k$+1)

If, after computing the style score 232($k$), the stylization subsystem 170 determines to cease iterating based on the completion criteria, then the stylization subsystem 170 transmits the current design 212($k$) to the workflow subsystem 150 as the stylized design 182. Subsequently, the workflow subsystem 150 adds the stylized design 182 to the stylized design set 180. In alternate embodiments, the stylized subsystem 170 may also transmit the style score 232($k$) for the current design 212($k$) to the workflow subsystem 150.

FIG. 3 is a more detailed illustration of the stylization subsystem 170 of FIG. 1, according to other various embodiments of the present invention. In particular, the stylization subsystem 170 depicted in FIG. 3 synthesizes any number of stylized designs 182 based on the target specification 166, the synthesis configuration 164, and the style model 132. In alternate embodiments, the stylization subsystem 170 may generate the stylized designs 182 based on the synthesis configuration 164 and any number of style models 132. For explanatory purposes only, the parenthetical number associated with each of a current design set 320, a set of control sets 342, a style distribution set 322, and a style score set 332 specifies an associated iteration. For example, the current design set 320(67) is generated during the $67^{th}$ iteration.

The current design set 320($k$) includes, without limitation any number of current designs 212. The number of current designs 212 included in the current design set 320($a$) may vary from the number of current designs 212 included in the current design set 320($b$). The style distribution set 322($k$) includes, without limitation, a different style distribution 222 for each of the current designs 212 included in the current design set 320($k$). The style score set 332($k$) includes, without limitation, a different style score 232 for each of the current designs 212 included in the current design set 320($k$). The set of control sets 342($k$) specifies, without limitation, any number of control sets 242.

As shown, the stylization subsystem 170 includes, without limitation, the evaluation application 172 and the generation application 174. In operation, the stylization subsystem 170 initializes the style score set 332(0) to an empty set. The evaluation application 172 and the generation application 172 then execute an iterative design process that generates any number of stylized designs 182.

For the $k^{th}$ iteration, the generation application 174 generates the current design set 320($k$) based on synthesis configuration 164 and the style score set 332($k$–1). As shown, the generation application 174 includes, without limitation, a synthesis engine 310 and the shape generation engine 210. The synthesis engine 310 executes any number and type of optimization operations based on the synthesis configuration 164 and the style score set 332($k$–1) to generate the set of control sets 342($k$). For instance, the synthesis engine 310 may execute any number and combination of generative design operations, evolutionary design operations, multi-objective optimization operations, etc.

In alternate embodiments, the synthesis engine 310 may perform optimization operations based on the synthesis configuration 164, the style score set 332($k$–1), and any amount of additional data in any technically feasible fashion. For instance, in some embodiments, the synthesis engine 310 may perform gradient-based optimization operations based on the style score set 332($k$–1), any number of previously generated current design sets 320, and any number of previously generated style score sets 332. In the same or other alternate embodiments, the synthesis engine 310 generates the current design set 320($k$) without generating the set of control sets 342($k$) and the shape generation engine 210 is omitted from the generation application 174.

Each of the control sets 242 included in the set of control sets 342($k$) includes any amount of data that configures the shape generation engine 210 to generate a different current design 212 that is included in the current design set 320($k$). For each of the control sets 242($x$), the shape generation engine 210 generates a different current design 212($x$) and adds the current design 212($x$) to the current design set 320($k$). As described previously in conjunction with FIG. 2, the shape generation engine 210 may generate the current design 212 based on the associated control set 242 and any amount (including none) of additional information in any technically feasible fashion.

As shown, the evaluation application 172 generates the style score set 332($k$) based on the current design set 320($k$). The evaluation application 172 includes, without limitation, the classification engine 220 and the comparison engine 230. For each of the current designs 212($x$) included in the current design set 320($k$), the classification engine 220 generates the style distribution 222($x$) included in the style distribution set 322($k$) based on the style model 132. More precisely, to generate the style distribution 222($x$), the classification engine 220 provides the current design 212($x$) included in the current design set 320($k$) as an input to the style model 132. The output of the style model 132 is the style distribution 222($x$). In alternate embodiments, the output of the style model 132 may be any type of characterization information and the techniques described herein are modified accordingly.

Subsequently, for each of the current designs 212(x) included in the current design set 320(k), the comparison engine 230 generates the style score 232(x) included in the style score set 332(k) based on the style distribution 222(x) included in the style distribution set 322(k). The style score 232(x) is a value for a style metric that indicates a level of compliance that the current design 212(x) included in the current design set 320(k) has with the target style specification 166. The comparison engine 230 may institute any style metric and determine the style scores 232 in any technically feasible fashion.

The stylization subsystem 170 then determines whether to continue iterating based on any number and type of completion criteria (not shown). In alternate embodiments, the stylization subsystem 170 may determine whether to cease iterating at any point in the design process. For instance, in alternate embodiments, the stylization subsystem 170 may determine whether to continue iterating immediately after the generation application 174 generates the current design set 320(k), If the stylization subsystem 170 determines to continue iterating, then the generation application 174 modifies the current design set 320(k) to generate the current design set 320(k+1). Otherwise, the stylization subsystem 170 transmits each of the current designs 212(x) included in the current design set 320(k) as the stylized design 182(x) to the workflow subsystem 150. Subsequently, the workflow subsystem 150 adds each of the stylized designs 182 to the stylized design set 180. In alternate embodiments, the stylized subsystem 170 may also transmit the style score set 332(k) to the workflow subsystem 150.

Curating Stylized Designs

Figure 4:
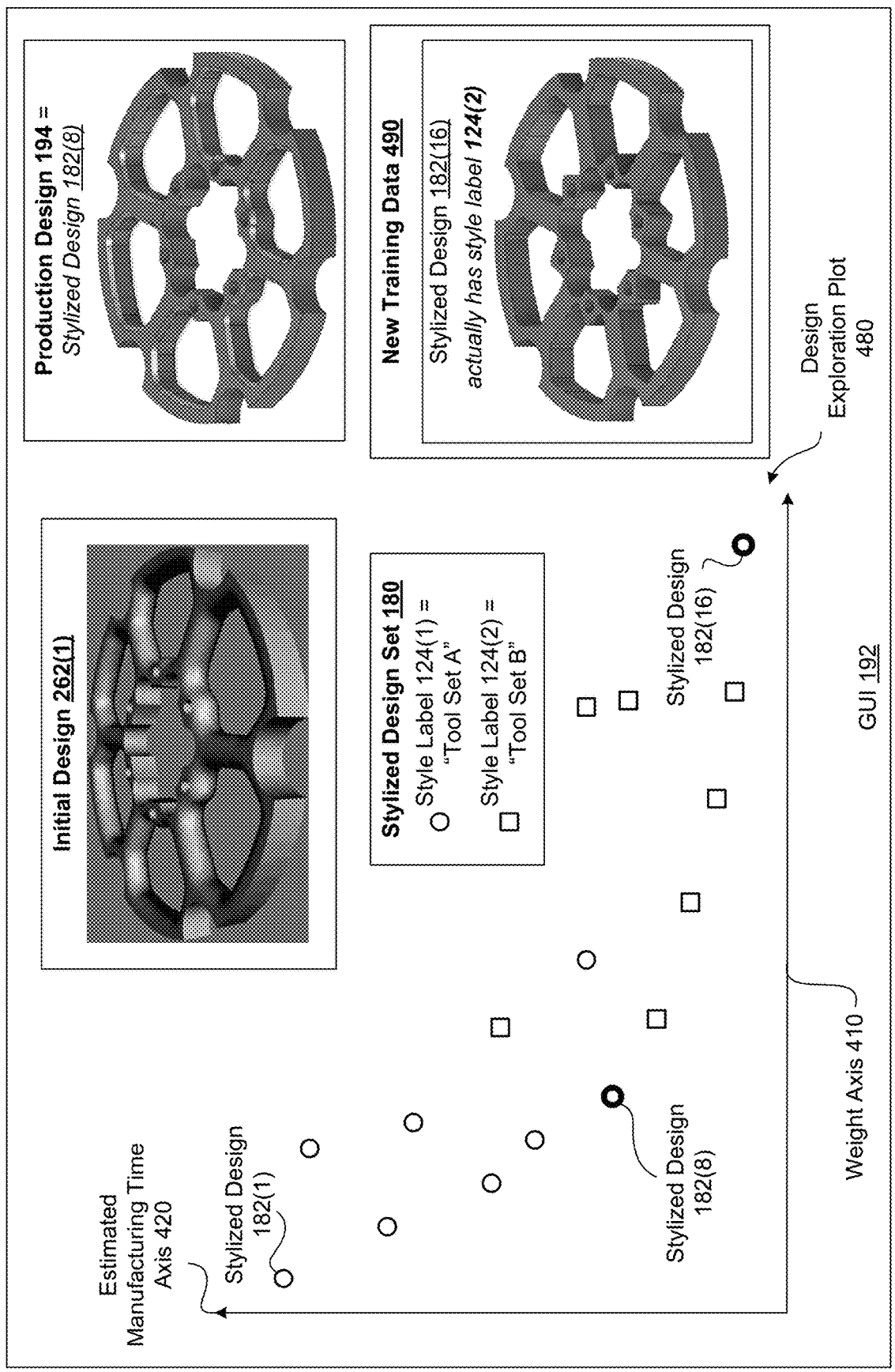
FIG. 4 is an exemplary illustration of the graphical user interface (GUI) of FIG. 1, according to various embodiments of the present invention.

FIG. 4 is an exemplary illustration of the graphical user interface (GUI) 192 of FIG. 1, according to various embodiments of the present invention. As shown, the GUI 192 depicts the initial design 262(1), a design exploration plot 480, the production design 194, and new training data 490.

For explanatory purposes only, during the training phase, the style model 132 learns the style labels 124(1) "tool set A" and the style label 124(2) "tool set B." The style label 124(1) represents a style of design that can be manufactured efficiently on a CNC machine with a first set of tools (tool set A). The style label 124(2) represents a style of design that can be manufactured efficiently on the CNC machine using a second set of tools (tool set B). During the inspiration phase, the designer specifies the initial design 262(1) and the target design specification 166 having the positive target of either the style label 124(1) or the style label 124(2). As shown, the initial design 262( ) is a wheel-shaped mechanical part having an organic shape. During the design generation phase, the stylization subsystem 170 generates the stylized designs 182(1)-182(16) included in the stylized design set 180 based on the initial design 262(1).

During the curation phase, the designer configures the curation engine 188 to generate and display the design exploration plot 480. The design exploration plot 480 depicts each the stylized designs 182 included in the stylized design set 180 with respect to a weight axis 410 and an estimated manufacturing time axis 420. As shown, if the stylized design 182(x) belongs to the style associated with the style label 124(1) "tool set A," then the curation engine 188 depicts the stylized design 182(x) via a square in the design exploration plot 480. If the stylized design 182(x) belongs to the style associated with the style label 124(2) "tool set B," then the curation engine 188 depicts the stylized design 182(x) via a circle in the design exploration plot 480.

Based on the design exploration plot 480, the designer selects the stylized design 182(8) that has the second lowest estimated manufacturing time of the stylized designs 182 classified as belonging to the style associated with tool set A as the production design 194. The designer also interacts with the GUI 192 to add the new training data 490 to the training database 120 and re-generate the style model 132 based on the updated training database 120. As shown, the new training data 490 specifies that the stylized design 182(16) which is classified as belonging to the style associated with the tool set B actually belongs to the style associated with the tool set A. Advantageously, re-training the style model 132 based on the new training data 490 improves the performance (e.g., increases the accuracy) of the style model 132.

Figure 5A:
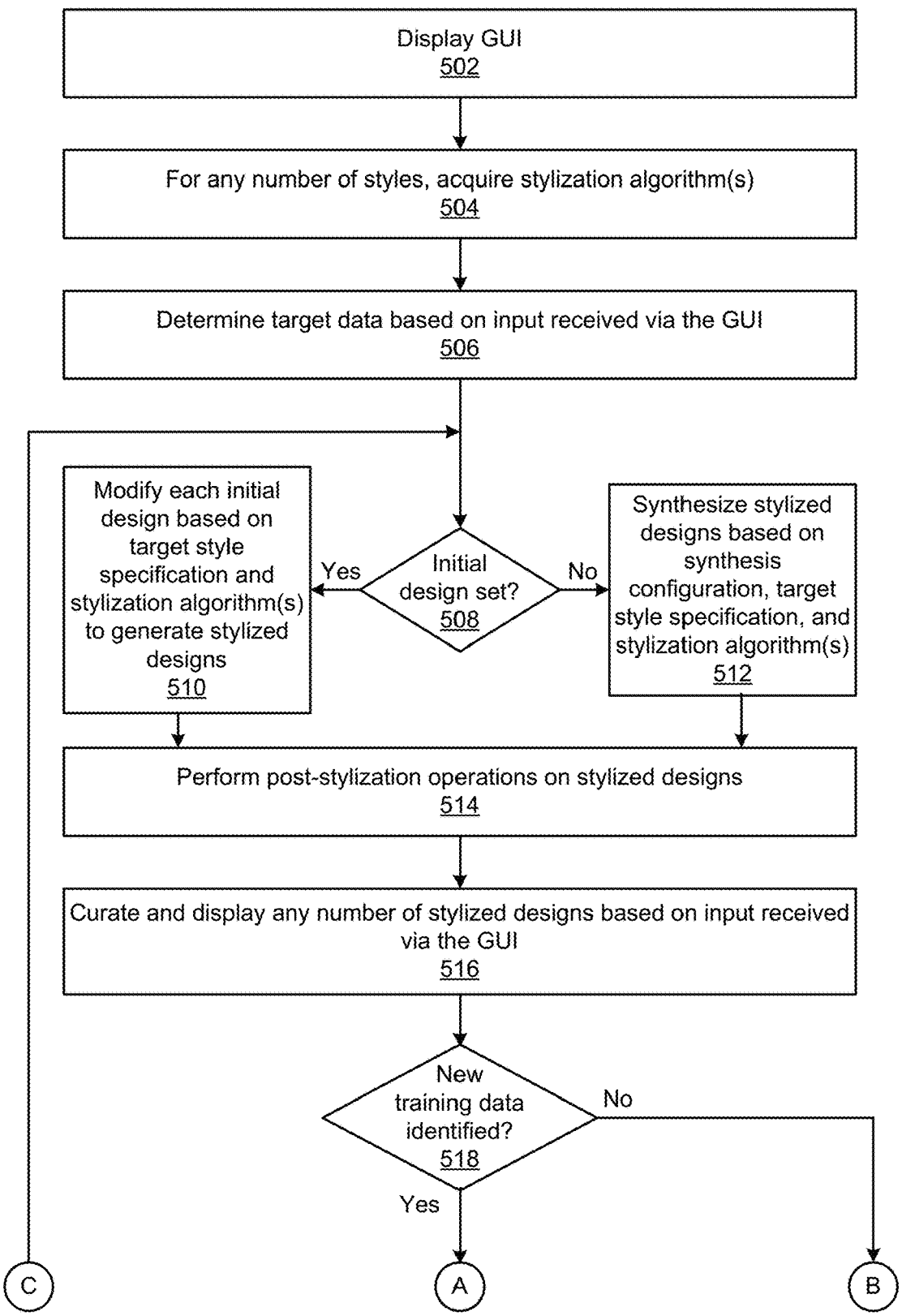
FIGS. 5A-5B set forth a flow diagram of method steps for generating and evaluating designs based on stylistic preferences, according to various embodiments of the present invention.
Figure 5B:
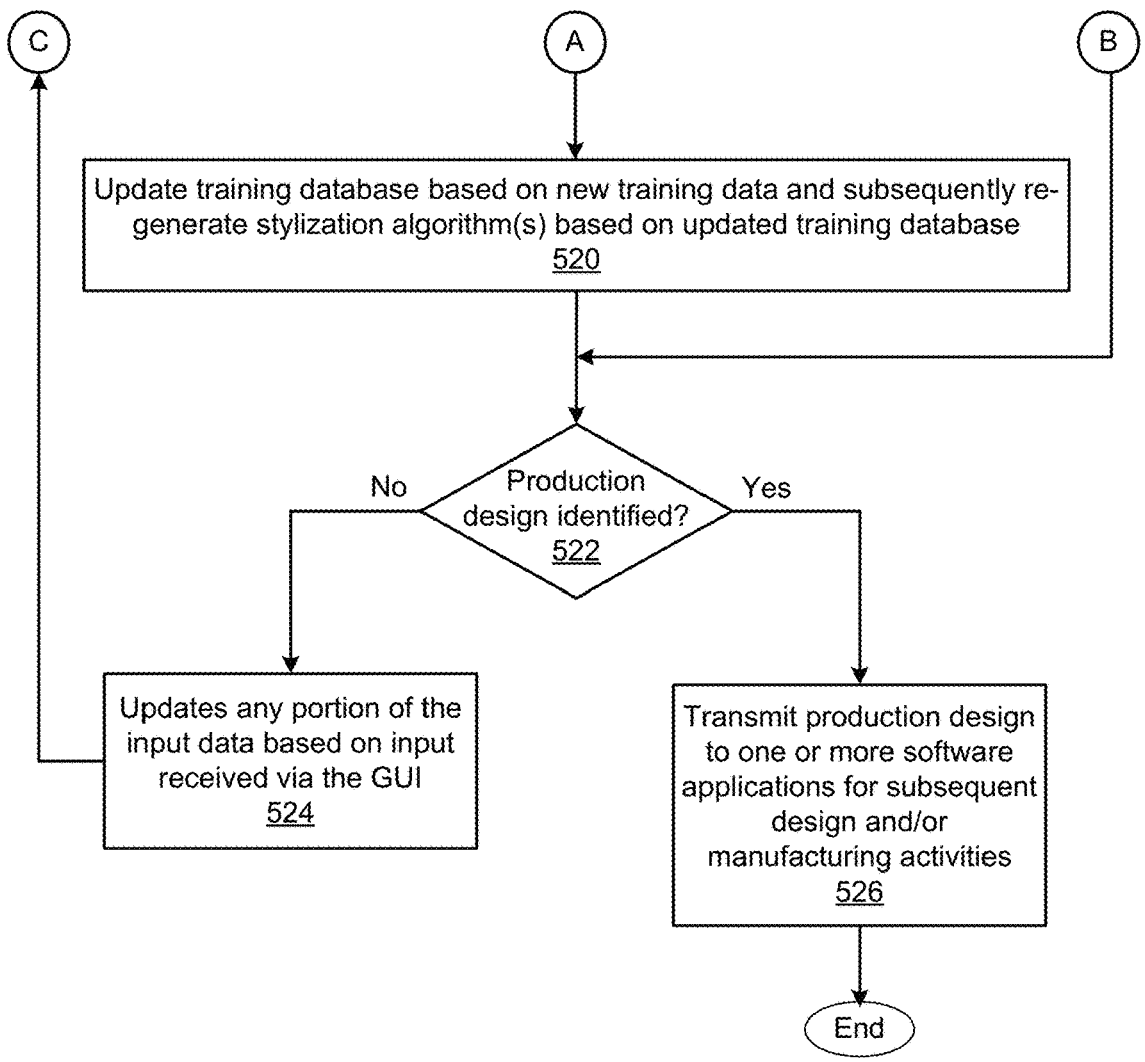

FIGS. 5A-5B set forth a flow diagram of method steps for generating and evaluating designs based on stylistic preferences, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the interface engine 152 displays the GUI 192 on the user device 190 to enable interaction with a designer. At step 504, for any number of styles, the workflow subsystem 150 acquires stylization algorithm(s) based on the training database 120. The workflow subsystem 150 may acquire any type of stylization algorithm(s) in any technically feasible fashion. For instance, in some embodiments, the workflow subsystem 150 configures the training application 130 to perform machine-learning operations to generate the style model 132 based on the training database 120. In other embodiments, for each style, the workflow subsystem 150 acquires a different style construction set of design primitives, design elements, design operations, and combinations thereof.

At step 506, the interface engine 152 determines the target data 160 based on input received via the GUI. At step 508, the workflow engine 150 determines whether the target data 160 includes the initial design set 162. If, at step 508, the workflow engine 150 determines that the target data 160 includes the initial design set 162, then the method 500 proceeds to step 510. At step 510, for each of the initial designs 262 included in the initial design set 162, the stylization subsystem 170 modifies the initial design 262 based on the target style specification 166 and the stylization algorithm(s) to generate any number of stylized designs 182. The method 500 then proceeds directly to step 514.

If, however, at step 508, the workflow engine 150 determines that the target data 160 does not include the initial design set 162, then the method 500 proceeds directly to step 512. At step 512, the stylization subsystem 170 synthesizes any number of stylized designs 182 based on the synthesis configuration 164, the target style specification 166, and the stylization algorithm(s). The method 500 then proceeds to step 514.

At step 514, the post-stylization engine 184 performs any number of post-stylization operations on the stylized designs 182. At step 516, the curation engine 188 curates and displays any number of the stylized designs 182 based on input received via the GUI 192. At step 518, the interface engine 152 determines whether any new training data 490 has been identified. If, at step 518, the interface engine 152 determines that no new training data 490 has been identified, then the method 500 proceeds directly to step 522.

If however, at step 518, the interface engine 152 determines that new training data 490 has been identified, then the method 500 proceeds to step 520. At step 520, the interface engine 152 updates the training database 120 based on the new training data 490. The training engine 130 subsequently re-generates the stylization algorithm(s) based on the updated training database 120. The method 500 then proceeds to step 522.

At step 522, the interface engine 152 determines whether the production design 194 has been identified. At step 522, if the interface engine 152 determines that the production design 194 has not been identified, then the method 500 proceeds to step 524. At step 524, the interface engine 152 updates any portion (including none) of the target data 180 based on input received via the GUI 192. The method 500 then returns to step 508, and the workflow subsystem 150 re-generates and re-curates the stylistic designs 182. The workflow subsystem 150 continues to cycle through steps 508-524 until the interface engine 152, at step 522, determines that the production design 194 has been identified.

If, however, at step 522, the interface engine 15 determines that the production design 194 has been identified, then the method 500 proceeds to step 526. At step 526, the workflow subsystem 150 transmits the production design 182 to one or more software applications for subsequent design and/or manufacturing activities. The method 500 then terminates.

Figure 6:
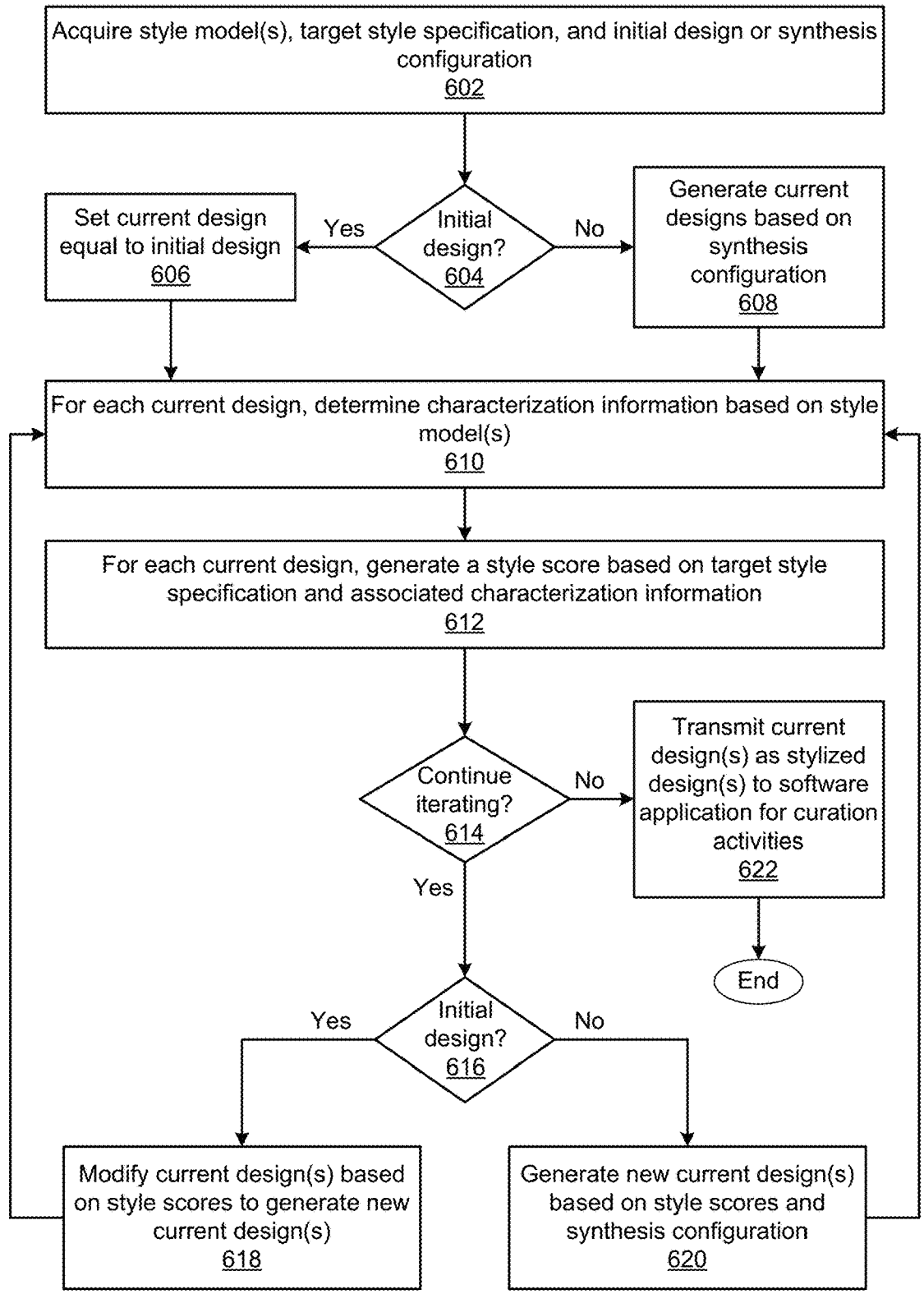
FIG. 6 is a flow diagram of method steps for generating designs based on stylistic preferences, according to various embodiments of the present invention.

FIG. 6 is a flow diagram of method steps for generating designs based on stylistic preferences, according to various embodiments of the present invention. Although the method steps are described with reference to the systems of FIGS. 1-4, persons skilled in the art will understand that any system configured to implement the method steps, in any order, falls within the scope of the present invention.

As shown, a method 600 begins at step 602, where the stylization subsystem 170 acquires one or more style model(s) 132, the target style specification 166, and the initial design 262 or the synthesis configuration 164. At step 604, the stylization subsystem 170 determines whether the stylization subsystem 170 has received the initial design 262. If, at step 604, the stylization subsystem 170 determines that the stylization subsystem 170 has received the initial design 262, then the method 600 proceeds to step 606. At step 606, the stylization subsystem 170 sets the current design 212 equal to the initial design 262. The method 600 then proceeds directly to step 610.

If, however, at step 604, the stylization subsystem 170 determines that the stylization subsystem 170 has not received the initial design 262, then the method 600 proceeds directly to step 608. At step 608, the generation application 174 generates any number of current designs 212 based on the synthesis configuration 164. The method 600 then proceeds to step 610.

At step 610, for each of the current designs 212(x), the classification engine 220 generates the characterization information (e.g., the style distribution 222(x)) based on the style model(s) 132. At step 612, for each of the current designs 212(x), the comparison engine 230 generates the style score 232(x) based on the associated characterization information and the target style specification 166.

At step 614, the stylization subsystem 170 determines whether to continue iterating. The stylization subsystem 170 may determine whether to continue iterating based on any number and type of completion criteria. If, at step 614, the stylization subsystem 170 determines to continue iterating, then the method 600 proceeds to step 616.

At step 616, the stylization subsystem 170 determines whether the stylization subsystem 170 received the initial design 262. If, at step 616, the stylization subsystem 170 determines that the stylization subsystem 170 received the initial design 262, then the method 600 proceeds to step 618. At step 618, the generation application 174 modifies the current design(s) 212 based on the style scores 232 to generate new current design(s) 212. The method 600 then returns to step 610, where the classification engine 220 generates the characterization information for each of the current designs 212 based on the style model(s) 132.

If, however, at step 616, the stylization subsystem 170 determines that the stylization subsystem 170 did not receive the initial design 262, then the method 600 proceeds directly to step 620. At step 620, the generation application 174 generates any number of new current design(s) 212 based on the synthesis configuration 164 and the style scores 232. The method 600 then returns to step 610, where the classification engine 220 generates the characterization information for each of the current designs 212 based on the style model(s) 132.

The stylization subsystem 170 continues to cycle through steps 610-620 until the stylization subsystem 170 determines to cease iterating. If, at step 614, the stylization subsystem 170 determines to cease iterating, then the method 600 proceeds directly to step 622. At step 622, the stylization subsystem 170 transmits each of the current designs 212 as a different stylized design 182 to a software application (e.g., the workflow subsystem 150) for any amount and type of curation, design, and/or manufacturing activities. The method 600 then terminates.

In sum, the disclosed techniques may be used to efficiently generate and evaluate designs that reflect a target style. In one embodiment, a workflow subsystem provides a design graphical user interface (GUI) that enables a stylization workflow. The stylization workflow includes a training phase, an inspiration stage, a design generation phase, and a curation phase. In the training phase, a training application trains a style model to classify the styles of designs based on a training database of existing designs and styles labels that identify different styles. After training, the style model maps a design to a style distribution that estimates the probabilities that the design belongs to any number of the styles defined via the style labels. In the inspiration phase, the workflow subsystem interacts with a designer via a GUI to determine a target style specification and a synthesis configuration. The target style specification expresses any number of stylistic preferences based on the style labels. The synthesis configuration specifies any number of functional goals and constraints that are not directly related to style.

In the design generation phase, a stylization subsystem executes an iterative design process based on the style model, the target style specification, and the synthesis configuration. The stylization subsystem includes, without limitation, a generation application and an evaluation application. In a first iteration, the generation application executes any number of optimization algorithms to generate a current design set based on the synthesis configuration. For each design included in the current design set, the evaluation engine computes a style score based on the style model and the target style specification. In each subsequent iteration, the generation application generates a new current design set based on the style scores and the synthesis configuration. The evaluation engine then computes the style scores for the new current design set. When a completion criterion (e.g., a maximum number of iterations, a minimum style score, etc.) is met, the stylization subsystem transmits each of the current designs included in the current design set as a stylized design to the workflow subsystem.

In the curation phase, the workflow subsystem interacts with a designer via the GUI to determine a curation style specification that specifies any number of stylistic preferences based on the style labels. For each of the stylized design, the evaluation application computes a curation score based on the style model and the curation style specification. Subsequently, a curation engine performs any number of filtering, sorting, plotting, etc. operations based on the curation scores to enable the designer to efficiently select one or more of the stylized designs as production design(s). At any point in the design stylization workflow, the workflow subsystem allows the designer to add any number of the stylized designs and/or any other designs along with associated style label(s) to the training database. The workflow subsystem then re-trains the style model based on the updated training database. In this manner, the workflow subsystem can continually improve the accuracy/performance of the style model.

At least one technical advantage of the disclosed techniques relative to the prior art is that, unlike prior art approaches, the workflow subsystem provides an automated workflow for generating and evaluating designs based on target styles. Each target style may be associated with a sense of character, an identity (e.g., a corporate identity), a cultural/social background, and/or a manufacturing commonality (e.g., a manufacturing machine, a manufacturing tool, a manufacturing tool set, a manufacturing method, etc.). For example, a target style could encapsulate aesthetic traits associated with a particular company as well as commonalities between a set of parts that can be manufactured efficiently with a particular CNC milling machine. In some embodiments, a GUI allows target style(s) to be specified and a machine-learning model is used to characterize designs based on the specified target style(s). By contrast, prior art techniques provide neither GUIs that enable style-related input nor mechanisms that effectively account for style-related input. Because the workflow subsystem can substantially increase the number of designs that can be generated and evaluated based on the target style in a given amount of time, relative to prior art approaches, the overall quality of the design ultimately selected for production can be improved. Additionally, since novice designers can implement the automated workflow successfully, without assistance from more experienced designers. These technical advantages provide one or more technological advancements over the prior art approaches.

1. In some embodiments, a computer-implemented method for generating designs that accounts for stylistic preferences comprises computing first characterization information based on a first design and a trained machine-learning model that maps one or more designs to characterization information associated with one or more styles; computing a style score based on the first characterization information and a target style that is included in the one or more styles; and generating a second design based on the style score, wherein the second design is more representative of the target style than the first design.

2. The computer-implemented method of clause 1, wherein the trained machine-learning model comprises a binary classification model, a multiclass classification model, or a regression model.

3. The computer-implemented method of clauses 1 or 2, wherein the trained machine-learning model is trained based on a plurality of designs associated with a first class of objects, and the first design is associated with a second class of objects.

4. The computer-implemented method of any of clauses 1-3, further comprising performing one or more data mining operations to acquire training data; and executing one or more unsupervised learning algorithms to generate the trained machine-learning model based on the training data.

5. The computer-implemented method of any of clauses 1-4, wherein generating the second design comprises executing a multi-objective optimization algorithm based on the style score, a first objective that is related to the style score, and a second objective that is not related to the style score.

6. The computer-implemented method of any of clauses 1-5, wherein the second objective is related to at least one of physical performance, mechanical performance, environmental impact, energy efficiency, ergonomics, manufacturing time, manufacturing cost, and running cost.

7. The computer-implemented method of any of clauses 1-6, wherein generating the second design comprises executing a gradient-based optimization algorithm based on the style score and the first design.

8. The computer-implemented method of any of clauses 1-7, wherein generating the second design comprises modifying the first design based on the style score and at least one of a topology optimization algorithm, a parametric optimization algorithm, a stochastic optimization algorithm, an evolutionary optimization algorithm, and a constrained shape reconstruction algorithm.

9. The computer-implemented method of any of clauses 1-8, wherein computing the style score comprises determining a first probability included in the first characterization information based on the target style; determining that the target style is a positive target; and increasing the style score based on the first probability.

10. The computer-implemented method of any of clauses 1-9, wherein the target style is associated with at least one of a sense of character, a corporate identity, a cultural background, a manufacturing tool, and a manufacturing method.

11. In some embodiments, one or more non-transitory computer readable media include instructions that, when executed by one or more processors, cause the one or more processors to generate designs that account for stylistic preferences by performing the steps of computing first characterization information based on a first design and a trained machine-learning model that maps one or more designs to characterization information associated with one or more styles; computing a style score based on the first characterization information and a first style preference that is associated with at least a first style included in the one or more styles; and generating a second design based on the style score, wherein the second design is more representative of the first style preference than the first design.

12. The one or more non-transitory computer readable media of clause 11, wherein the first characterization information comprises a probability distribution across the one or more styles, a Boolean value, or a particular style included in the one or more styles.

13. The one or more non-transitory computer readable media of clauses 11 or 12, wherein the trained machine-learning model is trained based on a plurality of designs associated with a first class of objects, and the first design is associated with a second class of objects.

14. The one or more non-transitory computer readable media of any of clauses 11-13, further comprising performing one or more data mining operations to acquire training data; and executing one or more unsupervised learning algorithms to generate the trained machine-learning model based on the training data.

15. The one or more non-transitory computer readable media of any of clauses 11-14, wherein generating the second design comprises executing a multi-objective optimization algorithm based on the style score, a first objective that is related to the style score, and a second objective that is not related to the style score.

16. The one or more non-transitory computer readable media of any of clauses 11-15, wherein the second objective is related to at least one of physical performance, mechanical performance, environmental impact, energy efficiency, ergonomics, manufacturing time, manufacturing cost, and running cost.

17. The one or more non-transitory computer readable media of any of clauses 11-16, wherein generating the second design comprises executing a gradient-based optimization algorithm based on the style score and the first design.

18. The one or more non-transitory computer readable media of any of clauses 11-17, wherein computing the style score comprises determining that the first style is a negative target based on the first style preference; determining a first probability included in the first characterization information based on the first style; and decreasing the style score based on the first probability.

19. The one or more non-transitory computer readable media of any of clauses 11-18, wherein the first style is characterized by at least one of an aesthetic trait and a manufacturing-related property.

20. In some embodiments, a system for generating designs that accounts for stylistic preferences comprises one or more memories storing instructions; and one or more processors that are coupled to the one or more memories and, when executing the instructions, are configured to compute first characterization information based on a first design and a trained machine-learning model that maps one or more designs to characterization information associated with one or more styles; compute a style score based on the first characterization information and a target style that is included in the one or more styles; and execute at least one optimization algorithm to generate a second design based on the style score, wherein the second design is more representative of the target style than the first design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs that accounts for stylistic preferences, the method comprising:
    executing, via a processor, a trained machine-learning model to generate first characterization information based on a first computer-aided design (CAD) model of a first physical object, wherein the trained machine-learning model maps one or more designs to characterization information associated with one or more aesthetic styles;
    computing, via the processor executing a CAD-based evaluation application, a first style score associated with the first CAD model based on the first characterization information and a target style that is included in the one or more aesthetic styles, wherein the first style score includes a first gradient associated with a first design parameter of the first CAD model; and
    generating, via the processor executing a CAD-based generation application, a second CAD model of the first physical object by executing an optimization algorithm that modifies the first CAD model based on a first objective of optimizing the first style score by iteratively modifying the first design parameter of the first CAD model based on the first gradient of the first style score to generate the second CAD model, wherein the second CAD model is associated with a second style score that is different from the first style score.

2. The computer-implemented method of claim 1, wherein the trained machine-learning model comprises a binary classification model, a multiclass classification model, or a regression model.

3. The computer-implemented method of claim 1, wherein the trained machine-learning model is trained based on a plurality of designs associated with a first class of objects, and the first CAD model is associated with a second class of objects.

4. The computer-implemented method of claim 1, further comprising:
    performing one or more data mining operations to acquire training data; and
    executing one or more unsupervised learning algorithms to generate the trained machine-learning model based on the training data.

5. The computer-implemented method of claim 1, wherein generating the second CAD model by executing the optimization algorithm comprises executing a multi-objective optimization algorithm based on the first style score, the first objective that is related to the first style score, and a second objective that is not related to the first style score.

6. The computer-implemented method of claim 5, wherein the second objective is related to at least one of physical performance, mechanical performance, environmental impact, energy efficiency, ergonomics, manufacturing time, manufacturing cost, and running cost.

7. The computer-implemented method of claim 1, wherein computing the first style score comprises:
    determining a first probability included in the first characterization information based on the target style;
    determining that the target style is a positive target; and
    increasing the first style score based on the first probability.

8. The computer-implemented method of claim 1, wherein the target style is associated with at least one of a sense of character, a corporate identity, a cultural background, a manufacturing tool, and a manufacturing method.

9. One or more non-transitory computer readable media including instructions that, when executed by one or more processors, cause the one or more processors to generate designs that account for stylistic preferences by performing the steps of:
    executing a trained machine-learning model to generate first characterization information based on a first computer-aided design (CAD) model of a first physical object, wherein the trained machine-learning model maps one or more designs to characterization information associated with one or more aesthetic styles;
    computing, via the one or more processors executing a CAD-based evaluation application, a first style score associated with the first CAD model based on the first characterization information and a first style preference that is associated with at least a first aesthetic style included in the one or more aesthetic styles, wherein the first style score includes a first gradient associated with a first design parameter of the first CAD model; and
    generating, via the processor executing a CAD-based generation application, a second CAD model of the first physical object by executing an optimization algorithm that modifies the first CAD model based on a first objective of optimizing the first style score by iteratively modifying the first design parameter of the first CAD model based on the first gradient of the first style score to generate the second CAD model, wherein the second CAD model of the first object is associated with a second style score that is different from the first style score.

10. The one or more non-transitory computer readable media of claim 9, wherein the first characterization information comprises a probability distribution across the one or more aesthetic styles, a Boolean value, or a particular style included in the one or more aesthetic styles.

11. The one or more non-transitory computer readable media of claim 9, wherein the trained machine-learning model is trained based on a plurality of designs associated with a first class of objects, and the first CAD model is associated with a second class of objects.

12. The one or more non-transitory computer readable media of claim 9, further comprising:
    performing one or more data mining operations to acquire training data; and
    executing one or more unsupervised learning algorithms to generate the trained machine-learning model based on the training data.

13. The one or more non-transitory computer readable media of claim 9, wherein generating the second CAD model by executing the optimization algorithm comprises executing a multi-objective optimization algorithm based on the first style score, the first objective that is related to the first style score, and a second objective that is not related to the first style score.

14. The one or more non-transitory computer readable media of claim 13, wherein the second objective is related to at least one of physical performance, mechanical performance, environmental impact, energy efficiency, ergonomics, manufacturing time, manufacturing cost, and running cost.

15. The one or more non-transitory computer readable media of claim 9, wherein computing the first style score comprises:
- determining that the first aesthetic style is a negative target based on the first style preference;
- determining a first probability included in the first characterization information based on the first aesthetic style; and
- decreasing the first style score based on the first probability.

16. The one or more non-transitory computer readable media of claim 9, wherein the first aesthetic style is characterized by at least one of an aesthetic trait or a manufacturing-related property.

17. A system for generating designs that accounts for stylistic preferences, the system comprising:
- one or more memories storing instructions; and
- one or more processors that are coupled to the one or more memories and, when executing the instructions, are configured to:
  - execute a trained machine-learning model to generate first characterization information based on a first computer-aided design (CAD) model of a first physical object, wherein the trained machine-learning model maps one or more designs to characterization information associated with one or more aesthetic styles;
  - compute, via the one or more processors executing a CAD-based evaluation application, a first style score associated with the first CAD model based on the first characterization information and a target style that is included in the one or more aesthetic styles, wherein the first style score includes a first gradient associated with a first design parameter of the first CAD model; and
  - generate, via the one or more processors executing a CAD-based generation application, a second CAD model of the first physical object by executing an optimization algorithm that modifies the first CAD model based on a first objective of optimizing the first style score by iteratively modifying the first design parameter of the first CAD model based on the first gradient of the first style score to generate the second CAD model, wherein the second CAD model is associated with a second style score that is different from the first style score.

* * * * *